US012592036B2

(12) United States Patent
    Lawler

(10) Patent No.: US 12,592,036 B2
(45) Date of Patent: *Mar. 31, 2026

(54) BLENDING ELEVATION DATA INTO A SEAMLESS HEIGHTFIELD

(71) Applicant: Microsoft Technology Licensing, LLC, Redmond, WA (US)

(72) Inventor: Duncan Murray Lawler, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 200 days.

This patent is subject to a terminal disclaimer.

(21) Appl. No.: 18/473,814

(22) Filed: Sep. 25, 2023

(65) Prior Publication Data
    US 2024/0013486 A1     Jan. 11, 2024

Related U.S. Application Data

(63) Continuation of application No. 17/227,254, filed on Apr. 9, 2021, now Pat. No. 11,810,252.

(51) Int. Cl.
    *G06T 17/05*        (2011.01)
    *G06T 5/50*         (2006.01)

(52) U.S. Cl.
    CPC ............... *G06T 17/05* (2013.01); *G06T 5/50* (2013.01); *G06T 2207/20216* (2013.01)

(58) Field of Classification Search
    CPC ......... G06T 15/503; G06T 2207/20216; G06T 5/50; G06T 17/05
    See application file for complete search history.

(56) References Cited

U.S. PATENT DOCUMENTS

| | | | | | |
|---|---|---|---|---|---|
| 6,047,244 | A | * | 4/2000 | Rud, Jr. ............. | G05B 19/0423 |
| | | | | | 375/295 |
| 2012/0063675 | A1 | * | 3/2012 | Dittert ..................... | G06T 11/40 |
| | | | | | 382/162 |
| 2012/0119879 | A1 | * | 5/2012 | Estes ...................... | H04N 7/181 |
| | | | | | 340/8.1 |

(Continued)

OTHER PUBLICATIONS

T. Goulden, C. Hopkinson, R. Jamieson, S. Sterling, Sensitivity of DEM, slope, aspect and watershed attributes to LiDAR measurement uncertainty, Remote Sensing of Environment, vol. 179, 2016, pp. 23-35, ISSN 0034-4257, https://doi.org/10.1016/j.rse.2016.03.005 (Year: 2016).*

(Continued)

*Primary Examiner* — Kee M Tung
*Assistant Examiner* — Nauman U Ahmad
(74) *Attorney, Agent, or Firm* — Ray Quinney & Nebeker P.C.

(57)            ABSTRACT

The present disclosure relates to methods, devices, and systems for blending geographic data when combining geographic data sources. The methods, devices, and systems identify a blend region for transitioning between a first dataset and a second dataset. The methods, devices, and systems extrapolate geographic data from the second dataset to blend with the geographic data from the first dataset to create blended elevation data in the blend region. The methods, devices, and systems may generate an image for a geographic region with the first set of geographic data, the second set of geographic data, and the blended elevation data.

20 Claims, 16 Drawing Sheets

(56) References Cited

U.S. PATENT DOCUMENTS

2012/0179433 A1 * 7/2012 Wivell .................... G06T 17/05
                                                              703/2
2017/0169605 A1 * 6/2017 Salomonsson ............ G06T 7/55
2017/0301133 A1 * 10/2017 Min ...................... G06T 15/503

OTHER PUBLICATIONS

Bolstad, Paul V., and Timothy Stowe. "An evaluation of DEM accuracy: elevation, slope, and aspect." Photogrammetric Engineering & Remote Sensing 60.11 (1994): 7327-7332. (Year: 1994).*
Water, GIS. "04.2 Calculate the Average Slope of the Subcatchments." YouTube, YouTube, Mar. 11, 2016, www.youtube.com/watch?v=DzCGVDuxKqY. (Year: 2016).*
School, Geospatial. "QGIS Terrain Analysis: Hillshade, Slope, Aspect (Version 3.x)." YouTube, YouTube, Feb. 13, 2019, www.youtube.com/watch?v=B-5RQ909EyU (Year: 2019).*

* cited by examiner

BLENDING ELEVATION DATA INTO A SEAMLESS HEIGHTFIELD

CROSS-REFERENCE TO RELATED APPLICATIONS

This application is a continuation of U.S. patent application Ser. No. 17/227,254, filed Apr. 9, 2021, which is hereby incorporated by reference in its entirety.

BACKGROUND

Elevation data is available from many sources including optically derived sources (stereo matching, photogrammetry), radar derived sources (InSAR), LiDAR sources, and others. Each source comes with different resolution, accuracy, and modeling characteristics. For many use cases it is desirable to blend data from multiple different sources into a single continuous elevation model. Current blending techniques result in very visible discontinuities in elevation and visible artifacts which make the result less useful for applications that require a continuous surface. Current blending techniques are also readily apparent to visual inspection and draw the eye to the boundary.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an implementation, a method for blending elevation data is described. The method includes receiving a first dataset with a first set of elevation data for a geographic area. A second dataset with a second set of elevation data for the geographic area is received. A distance for a blend region for transitioning between the first dataset and the second dataset is determined. Elevation data is extrapolated from the second set of elevation data for one or more datapoints in the blend region. A blend function is applied to blend the extrapolated elevation data in the one or more datapoints in the blend region with the first set of elevation data to generate blended elevation data in the blend region. An image is generated with the first set of elevation data, the second set of elevation data, and the blended elevation data for the geographic area.

In an implementation, a method for filling gaps in geographic data is described. The method includes identifying at least one gap in geographic data for a geographic region. A plurality of datapoints is determined in the geographic data on an edge of the gap. For each datapoint on the edge, a plurality of rays is extended from the datapoint a distance. If a ray of the plurality of rays contacts a second datapoint on the edge of the gap, an elevation value is determined for the ray using a first elevation value for the datapoint and a second elevation value of the second datapoint. The elevation value is stored for each ray of the plurality of rays for the datapoint.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to blending geographic data, such as, elevation data. Elevation data comes from a variety of different sources including optically derived sources (stereo matching, photogrammetry), radar derived sources (InSAR), LiDAR sources, and others. The most common way of representing elevation data is a bitmap. For example, a two-dimensional bitmap includes pixels, where each pixel has an x, y cartesian coordinate and an elevation value relative to some geodata datum (ellipsoid, geoid). Each source that provides elevation data comes with different resolution, accuracy, and/or modeling characteristics.

Based on the characteristics of the source that collected the elevation data, the elevation data has a particular resolution and/or a particular error characteristics. In the case of radar derived data (e.g., SRTM), elevation data is returned from surfaces and/or substances that reflect the radar. Gaps occur in the dataset for surfaces and/or substances that do not reflect the radar (e.g., water). In addition, the resolution of the radar derived elevation data may be low. For example, large structures at low resolutions become rolling hills with radar derived data. In the case of optical datasets, gaps occur in the datasets for surfaces that do not have features to optically stereo match against.

Other sources may have more accurate results but still have gaps in the data. For example, LiDAR use a laser beam from an aircraft to reflect surfaces and the elevation data is returned in the reflection. For example, gaps in the elevation data occur for surfaces and/or substances that do not reflect the laser (e.g., water). Banding may also occur in the data due to sensor calibration issues. Other errors may occur in the data collection near the border of where the laser is reflecting, such as, noise or inaccurate data. In addition, if different surveys occurred over the same location at different times, changes in the ground and/or elevation over time (e.g., freeway embankments added, or a drainage system added) may cause differences in the datasets. Moreover, the surveys may not cover the same regions and/or areas, as such, the datasets may be discontinuous. The datasets may also be discontinuous because of the difference in the resolution of the data. For example, if the sampling of a dataset is perfectly accurate at some interval (e.g., 10 m) from a lower resolution source, to blend the dataset with a higher resolution source (e.g., 0.5 m), the edge typically falls between the sampling interval of the lower resolution source. The actual value is unknown between samples, and any interpolation will provide a value between samples that could be far from accurate.

Figure 1A:
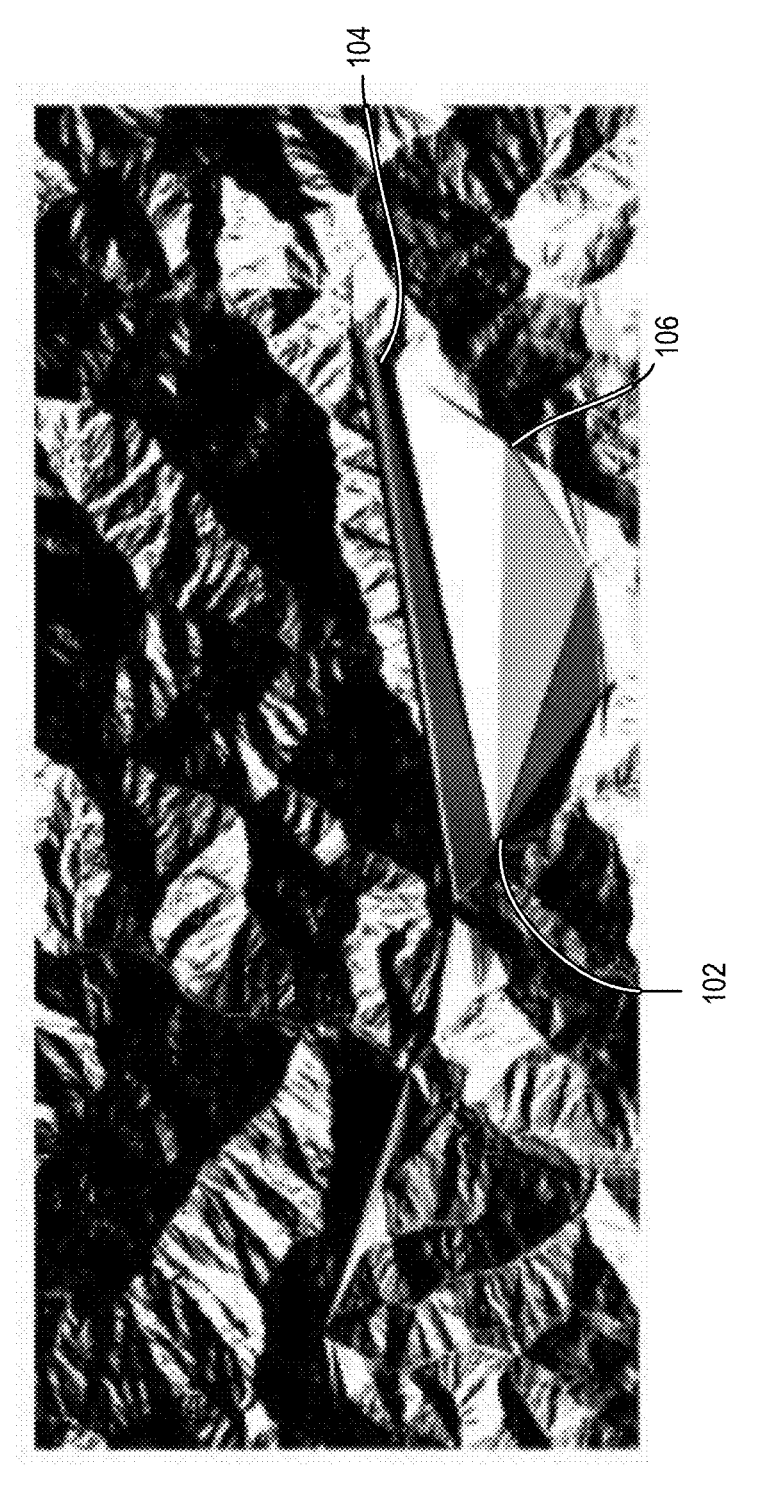
FIGS. 1A and 1B illustrate an existing solution for covering gaps in datasets for a geographic area when presenting a map image of the geographic area.
Figure 1B:
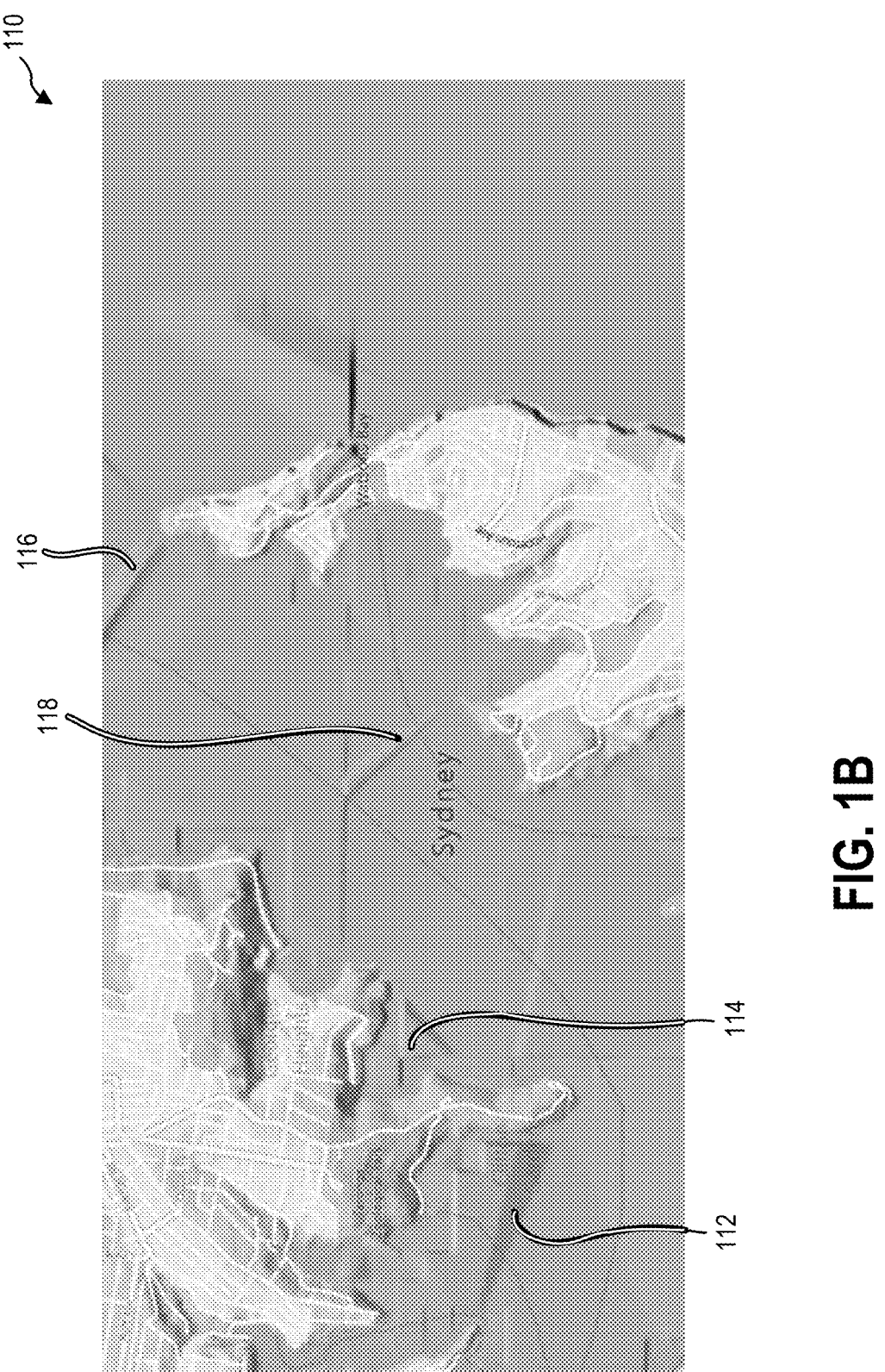

Depending on the sensors and the data collection system, the datasets may include lots of errors (gaps in the data, missing data, inaccurate data). For many use cases it is desirable to blend data from multiple different sources into a single continuous elevation model. Current blend techniques may use various algorithms on the datasets to blend the datasets together and/or fill gaps in the datasets. One example includes a triangulation algorithm that picks various points in the datasets where a gap occurs in the dataset and creates a triangle over the points on the map image to fill in the gaps, as illustrated in FIGS. 1A and 1B. FIG. 1A illustrates a map image 100 with a triangle 108 placed between points 102, 104, and 106. The triangle 108 is covering an area in the dataset where data is missing (e.g., an area where the surface did not reflect well or an area where data was not collected) and/or where data is incomplete. FIG. 1B illustrates an example map image 110 with several triangles or other shapes 112, 114, 116, 118 inserted into the water. Since water is a substance that is difficult to receive accurate data for, or any data at all, the dataset may be missing data or may have inaccurate data. The triangles or other shapes 112, 114, 116, 118 may show a change in elevation in the water where an elevation change does not occur. As such, map images 100, 110 add triangle artifacts to the images where data may be missing and/or incomplete adding visible discontinuities in the images 100, 110.

Figure 2:
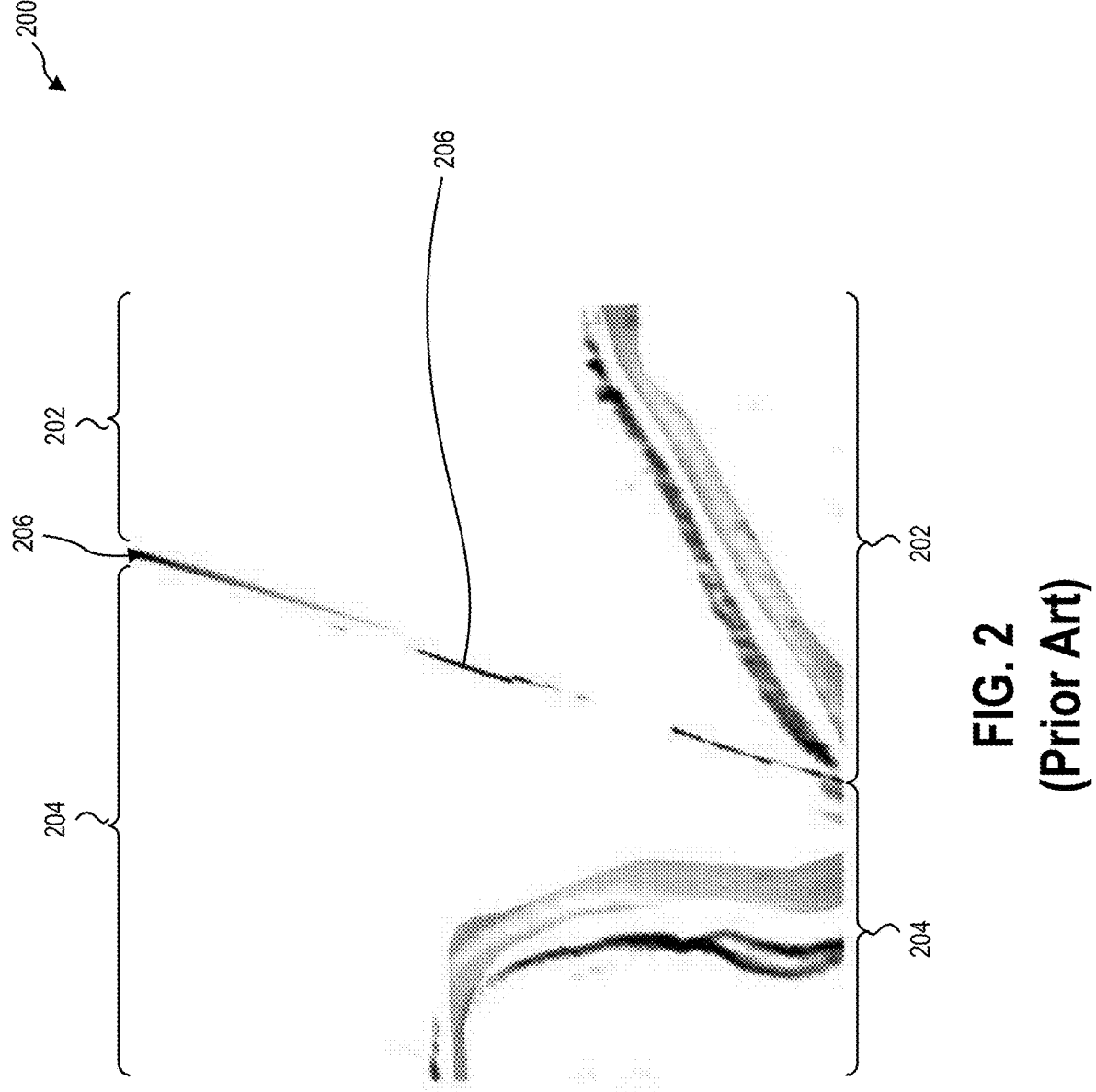
FIG. 2 illustrates an existing solution with a seam between two different datasets for a geographic area when presenting a map image of the geographic area.

Another example includes an algorithm adding seams between the borders of two different datasets, as illustrated in FIG. 2. FIG. 2 illustrates a map image 200 with a first dataset 202 and a second dataset 204. The map image 200 inserts a seam 206 or break between the two different datasets 202, 204. For example, a 2 meter area is not covered by the datasets 202, 204 and the seam 206 is visible when the source 204 is overlaid on 200, or drawn adjacent to 200. The seam 206 appears as a cliff at the boundary between the first dataset 202 and the second dataset 204. However, a cliff may not be present in the actual terrain there, as such, the map image 200 may be inaccurate showing a cliff at 206 when one does not exist. As such, the seam 206 creates a visible discontinuity in elevation in the image 206.

Thus, current blending techniques result in very visible discontinuities in elevation and visible artifacts which make the result less useful for applications that require a continuous surface. Current blending techniques are also readily apparent to visual inspection and draw the eye to the boundary.

The present disclosure provides better terrain visualization. The present disclosure involves methods, devices, and systems for blending elevation data when combining geographic data sources (e.g., combining images or data gained via radar, optical imagery, or lidar). The present disclosure identifies a blend region for transitioning between a first dataset and a second dataset and extrapolates geographic data from the second dataset to blend with the geographic data from the first dataset to create blended elevation data in the blend region. The present disclosure generates an image for a geographic region with the first set of geographic data, the second set of geographic data, and the blended elevation data.

The methods used by the present disclosure involve extrapolating elevation data from nearest neighbors, identifying slope values of nearby elevation data, blurring, and/or smoothing. Acute corners and low detail seams in the elevation data are also blended using similar algorithms.

One use case of the present disclosure includes using the terrain visualization for flight simulators. Another use case of the present disclosure includes using the three dimensional terrain display for augmented reality (AR) and/or virtual reality (VR) applications. Another use case of the present disclosure includes using the terrain visualization in mapping applications.

Another use case of the present disclosure includes using the terrain visualization for navigation applications. Current navigation applications (e.g., for providing turn by turn driving directions) only provide flat street views of the directions. By showing the terrain while providing navigation directions, users may see the current terrain while driving (e.g., driving over mountains, approaching a cliff, or heading down into a valley).

As such, the present disclosure provides a single seamless elevation model that reflects reality by mapping the geographic data together from different datasets smoothly while transitioning between the geographic data from the different datasets and/or different data sources.

Figure 3:
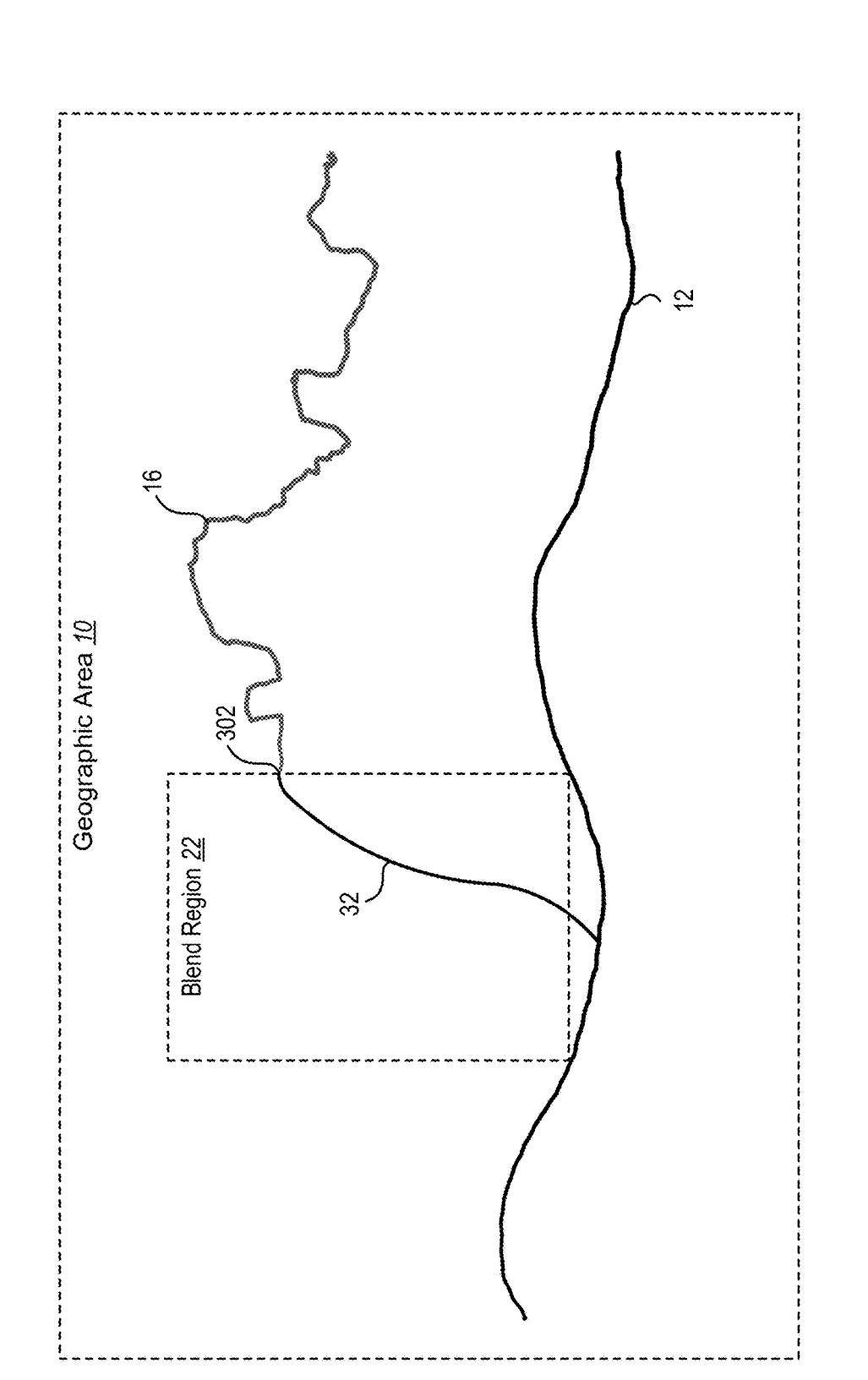
FIG. 3 illustrates a sideview of geographic data from two different datasets for a geographic area in accordance with some implementations.

Referring now to FIG. 3, illustrated is a sideview 300 of an elevation of geographic data from two different datasets 12, 16 for a geographic area 10. The geographic data may include digital images with elevation data for the terrain of the geographic area 10. The geographic data may be represented by a two-dimensional bitmap including pixels, where each pixel has an x, y cartesian coordinate and an elevation value relative to some geodata datum (ellipsoid, geoid) for the geographic area 10. The geographic data may also be represented by specifying an x, y, z vertex for each data sample. For example, the first dataset 12 is a global set of geographic data with elevation data obtained from SRTM and the second dataset 16 is local sets of geographic data with elevation data obtained from LiDAR and/or optical data.

The first dataset 12 has broad coverage of the geographic area 10. For example, the first dataset 12 has elevation data that covers majority of the geographic area 10 with low resolution and/or low sampling intervals. A low level of confidence of the elevation data for the first dataset 12 may occur because of the low sampling interval. At any one point in between the sample intervals for the geographic data for the first dataset 12, there is low confidence of what an actual heigh value is for the terrain of the geographic area 10 captured by the elevation data. There may be large variations from what the elevation data in the first dataset 12 shows as the elevation data for the terrain and what the actual elevation data is for the terrain. For example, the first dataset 12 may illustrate the elevation for a region of the terrain going down or lowering (e.g., a valley) when the actual elevation for the terrain is in increasing (e.g., a hill or mountain).

The second dataset 16 has a high rate of sampling of the geographic data but provides less coverage of the geographic area 10. The second dataset 16 does not provide geographic data after the end 302 of the second dataset 16. For example, the second dataset 16 has elevation data sampled at a high rate, and thus, the elevation data of the second dataset 16 has a higher level of confidence that the elevation data provided in the geographic data is more accurate for the terrain relative to the elevation data provided in the first dataset 12. However, the high rate of sampling may provide more noise in the geographic based on the high rate of sampling (noise near the borders of the coverage for the geographic dataset 16 and/or noise in the geographic data).

A blend region 22 may be created outside of the sample region of the second dataset 16 (e.g., where the geographic data for the second dataset 16 is missing and/or is not collected). Geographic data may be created and/or extrapolated from the geographic data of the second dataset 16 to appear like realistic geographic data for the terrain or look like realistic geographic data for the terrain in the blend region 22.

One or more algorithms or blend functions may blend the extrapolated geographic data or estimate geographic data for the blend region 22 with the geographic data from the first dataset 12 to create blended data 32. The blended data 32 transitions between the end of the second dataset 16 to the first dataset 12 while maintaining information provided by the geographic data of the second dataset 16. As such, the blended data 32 provides a smooth transition between the second dataset 16 and the first dataset 12 at the end 302 of the sample region of the second dataset 16.

Figure 4:
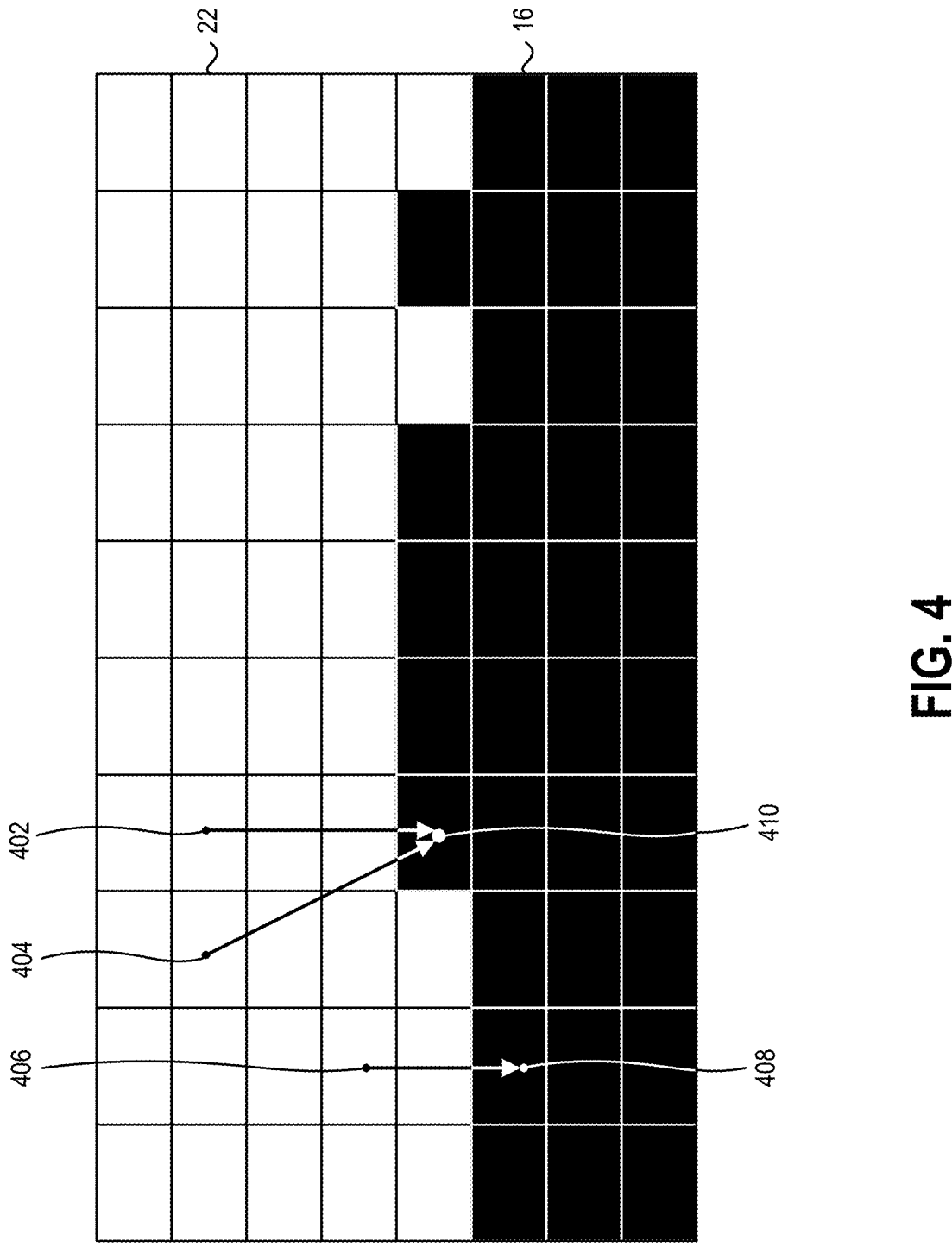
FIG. 4 illustrates an example of extrapolating data for different datapoints in a blend region from a nearest datapoint in a dataset in accordance with some implementations of the present disclosure.

Referring now to FIG. 4, illustrated is an example of extrapolating data for different datapoints 402, 404, 406 in a blend region 22. A top down view of the pixels of the second dataset 16 and an area of the blend region 22 is shown. The shaded area is where geographic data exists for the second dataset 16 and the white area (the blend region 22) is where geographic data from the is being extrapolated into and/or estimated. One method for extrapolating the data is, for each datapoint in the blend region 22, to identify a nearest datapoint (nearest neighbor) in the second dataset 16 and extrapolate the geographic data from the nearest datapoint in the second dataset 16 for the value of the datapoint in the blend region 22. For example, for the datapoints 402, 404 in the blend region 22, the nearest neighbor in the second dataset 16 is the datapoint 410. As such, the geographic data from the datapoint 410 is copied to both the datapoint 402 and the datapoint 404. In addition, for the datapoint 406, the nearest neighbor in the second dataset 16 is datapoint 408 and the geographic data from the datapoint 408 is copied to the datapoint 406.

While only three datapoints 402, 404, 406 are illustrated, the method may continue for all the datapoints in the blend region 22, or for a subset of datapoints in the blend region 22, to generate the extrapolated data for the blend region 22 to use in blending with the geographic data from the first dataset 12 (FIG. 3). One or more blend functions may blend the extrapolated data or estimated data for the blend region 22 (e.g., the geographic data copied to the datapoints 402, 404, 406) with the geographic data from the first dataset 12 to create blended data 32.

One example blend function is a linear blend function to generate the blended data 32 with the geographic data from the first dataset 12. The linear blend function is applied to the extrapolated data for the datapoints in the blend region 22 (e.g., datapoints 402, 404, 406) and takes a weighted average based on the distance of the extrapolated value to the nearest known value (e.g., datapoints 408, 410). When the distance is close to a known value, the weight for the extrapolated value is high, as the distance increases the weight decreases linearly with distance. As such, linear blending creates a straight line with the blended data 32 transitioning the end of the second dataset 16 to the first dataset 12, and typically results in sharply visible creases at the edges of the blend region 22 (as shown, for example, in FIG. 5).

Another example blend function is a cosine function. The cosine function is applied to the extrapolated data for the datapoints in the blend region 22 (e.g., datapoints 402, 404, 406) and a weighted average is determined by taking the cosine of the distance of the extrapolated value to the nearest known value (e.g., datapoints 408, 410), normalized to the 0-Pi range across the blend region 22 to generate the blended data 32. As such, a curved line is created with the blended data 32 easing the transition between the end of the second dataset 16 and the first dataset 12.

Other example blend functions include any higher order function that has continuous derivatives at the endpoints, such as, higher order polynomials functions or logarithmic functions.

Figure 5:
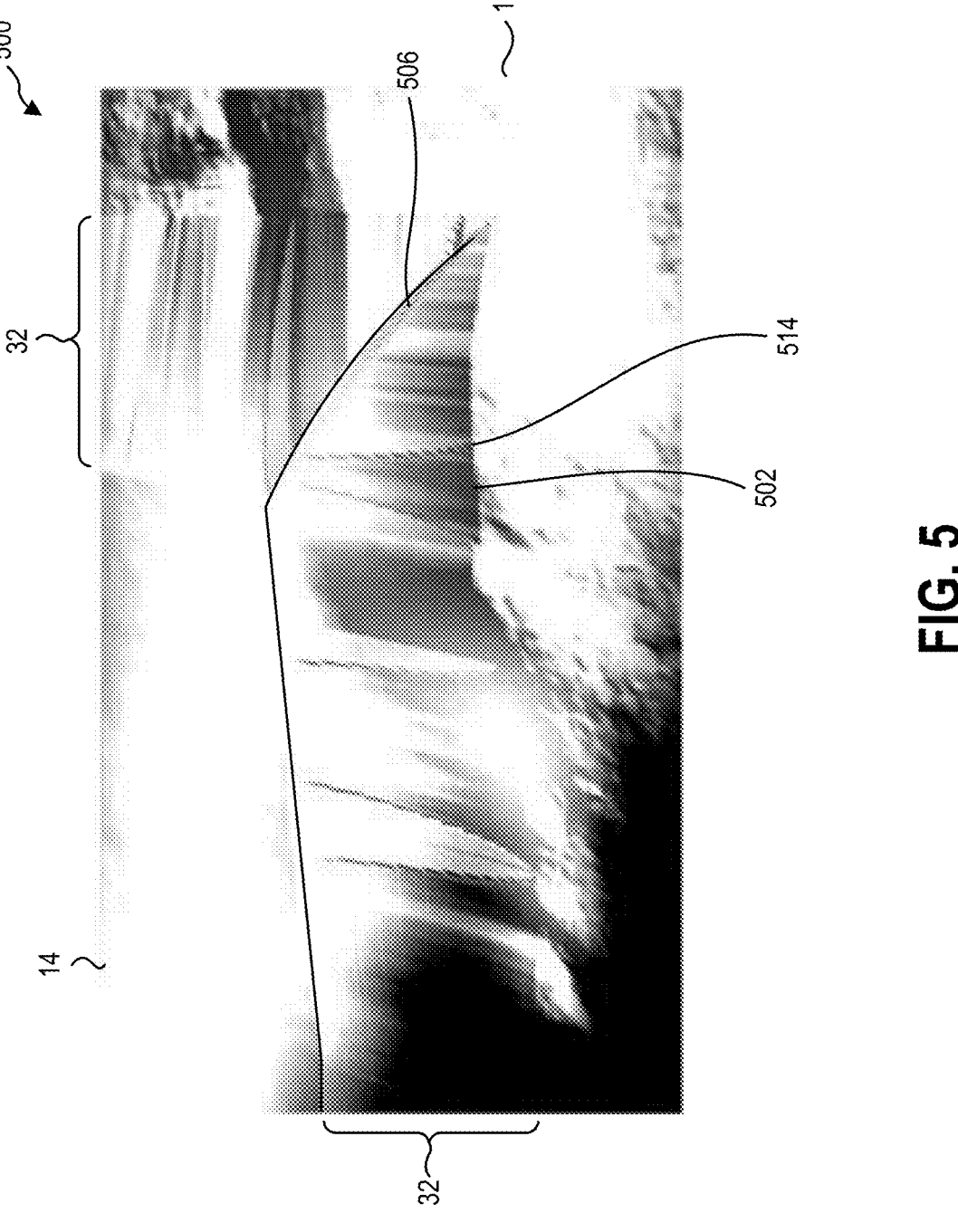
FIG. 5 illustrates an image where a linear blend function is used to create blended data in a blend region in accordance with some implementations of the present disclosure.

Referring now to FIG. 5, illustrated is an example image 500 showing the elevation data 14 for the geographic data from the first dataset 12 and the elevation data 18 for the geographic data from the second dataset 16. In addition, image 500 shows the blended data 32 between the elevation data 14 and the elevation data (e.g., the extrapolated data) in the blend region 22 transitioning between the first dataset 12 and the second dataset 16.

A linear blend function is used to create the blended data 32 in the blend region 22. For example, the linear blend function is applied to the extrapolated data identified by the nearest datapoint in the second dataset 16 (as discussed in FIG. 4) to generate the blended data 32 with the geographic data from the first dataset 12. The linear blend function takes a weighted average based on the distance of the extrapolated value to the nearest known value (e.g., the extrapolated data and the geographic data from the first dataset 12) and creates a straight line from the end of the second dataset 16 to the first dataset 12 with the blended data 32.

By using a linear blend function, additional artifacts may be included in the blended data 32 where the nearest datapoint in the second dataset 16 (e.g., nearest pixel) where the data is extrapolated from is on a slope where the elevation is changing, is far away, or the terrain is not continuous. Artifacts may include a sharp slope 502, curves 504, and/or horizontal lines 506 in the blended data 32.

Figure 6:
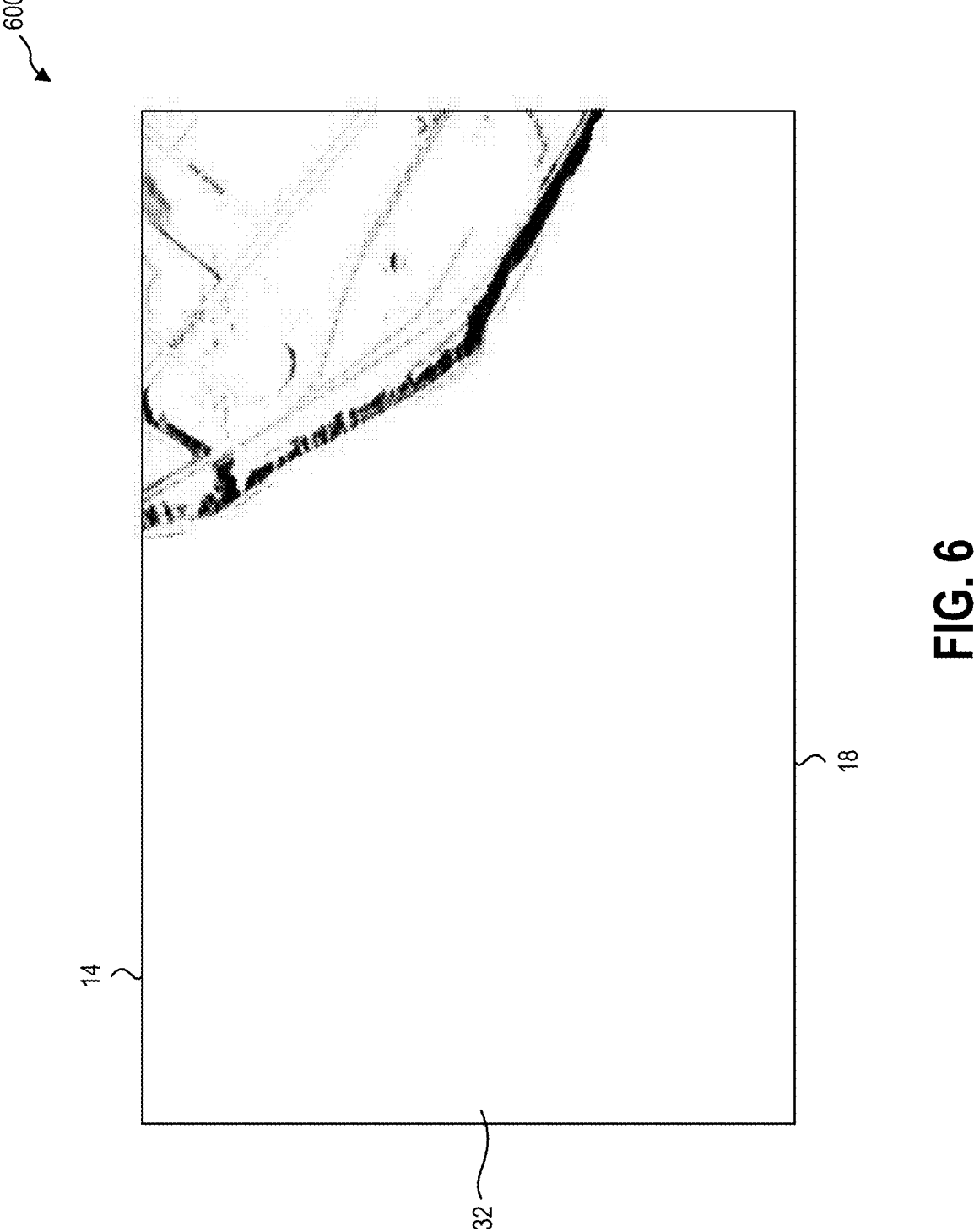
FIG. 6 illustrates an image where a cosine blend function is used to create blended data in a blend region in accordance with some implementations of the present disclosure.

Referring now to FIG. 6, illustrated is an example image 600 of an ocean showing the elevation data 14 for the geographic data from the first dataset 12 and the elevation data 18 for the geographic data from the second dataset 16. For example, the elevation data 14 for the geographic data from the first dataset 12 for a first region of the ocean is obtained at a first time period and the elevation data 18 for the geographic data from the second dataset 16 for a second region of the ocean is obtained at a second time period later than the first time period. As such, a blend region 22 may occur in the ocean where the first region of the ocean and the second region of the ocean are discontinuous and/or do not overlap.

A cosine blend function is used to create the blended data 32 in the blend region 22. For example, the cosine blend function is applied to the extrapolated data identified by the nearest datapoint in the second dataset 16 (as discussed in FIG. 4) to generate the blended data 32 with the geographic data from the first dataset 12. The cosine blend function takes the cosine of the distance of the extrapolated data to the nearest known value of the geographic data from the first dataset 12 and creates a curved line from the end of the second dataset 16 to the first dataset 12 with the blended data 32.

By using the cosine blend function, the blended data 32 smoothly transitions between the elevation data 18 of the second dataset 16 and the elevation data 14 of the first dataset 12, resulting in a smooth blend region 22 barely visible in the image 600.

Figure 7A:
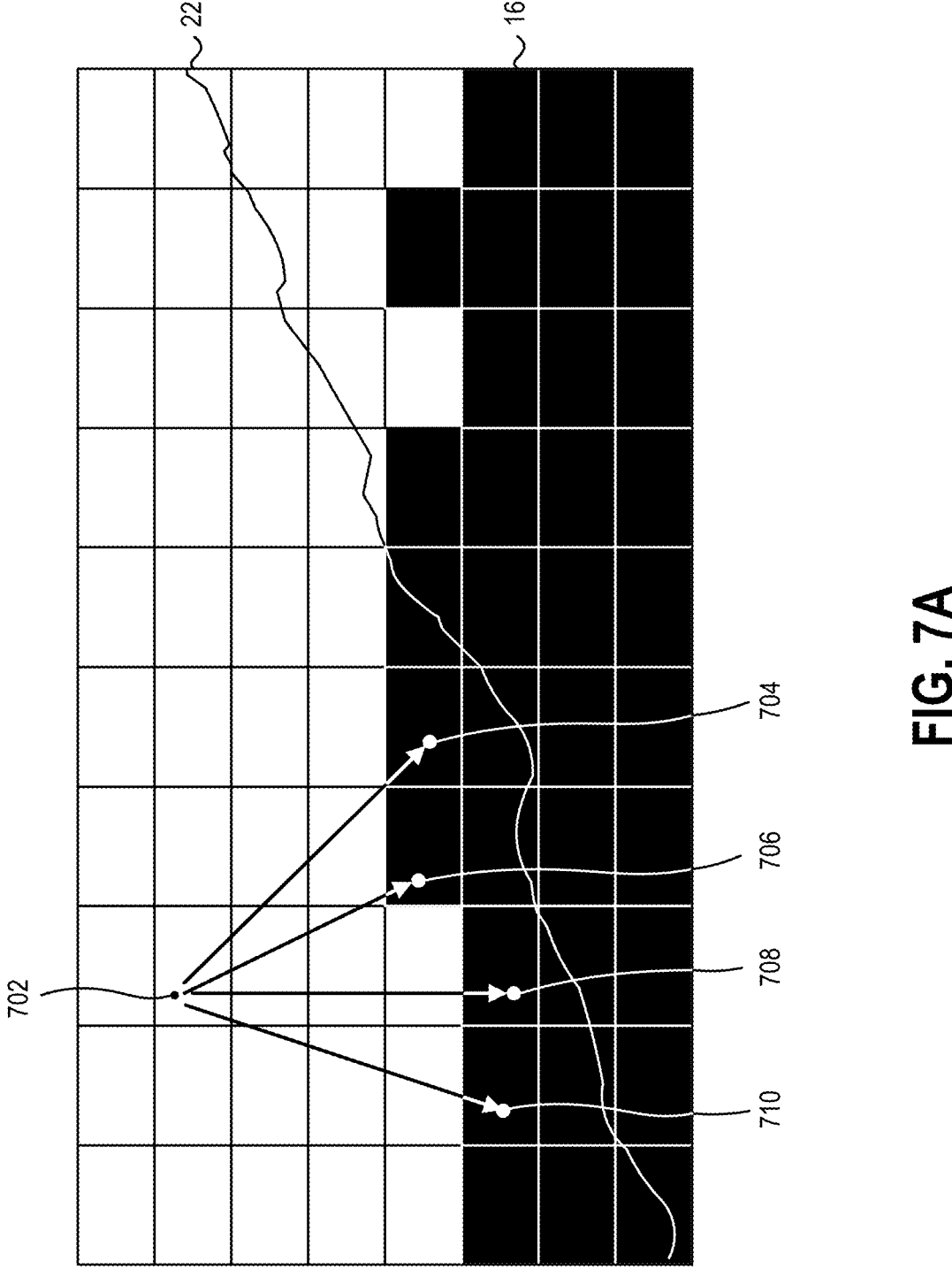
FIG. 7A illustrates an example of extrapolating data for different datapoints in a blend region from a plurality of nearest datapoints in a dataset in accordance with some implementations of the present disclosure.

Referring now to FIG. 7A, illustrated is an example of extrapolating data for a datapoint 702 in a blend region 22 from a plurality of nearest datapoints 704, 706, 708, 710 in a second dataset 16. A top down view of the pixels of the second dataset 16 and an area of the blend region 22 is shown. In addition, a side view of the elevation data 18 of the second dataset 16 is also shown (the left portion of the elevation data 18 has lower elevation values relative to the right portion of the elevation data 18, which has higher elevation values). The shaded area is where geographic data exists (e.g., the elevation data 18) for the second dataset 16 in the geographic area 10 (FIG. 3). The white area is the blend region 22 where geographic data is being extrapolated into from the second dataset 16.

One method for extrapolating the data is, for each data-point in the blend region 22, identifying a plurality of nearby datapoints (e.g., n neighbors, where n is an integer), in the second dataset 16 and take an average of the geographic data for the plurality of nearby datapoints. For example, the plurality of datapoints are on a slope of the elevation data 18 and the average of the elevation data 18 is extrapolated as the value of the datapoint in the blend region 22. For datapoint 702 in the blend region 22, four nearest datapoints (e.g., datapoints 704, 706, 708, 710) are identified in the second dataset 16 as close in distance to the datapoint 702. The average of the geographic data for the four datapoints 704, 706, 708, 710 is provided for the geographic data of the datapoint 702.

While four nearby datapoints (e.g., 704, 706, 708, 710) are used in this example, any number of nearby datapoints may be used for the data extrapolation. In addition, while a single datapoint 702 in the blend region 22 is used in this example, the method may continue for any number of datapoints in the blend region 22 to obtain the extrapolated data for the blend region 22. By averaging across a plurality datapoints 704, 706, 708, 710 in the second dataset 16, sharp slope artifacts may be prevented in transitioning between the different geographic data, resulting in smoother images.

One or more blend functions may blend the extrapolated data or estimated data for the blend region 22 (e.g., the average data copied to the datapoint 702) with the geographic data from the first dataset 18 to create blended data 32. For example, a cosine blend function is applied to the extrapolated data for the datapoints in the blend region (e.g., datapoint 702) and takes the cosine values between the distance of the extrapolated data and the nearest known value of the geographic data from the first dataset 12 to generate the blended data 32.

Figure 7B:
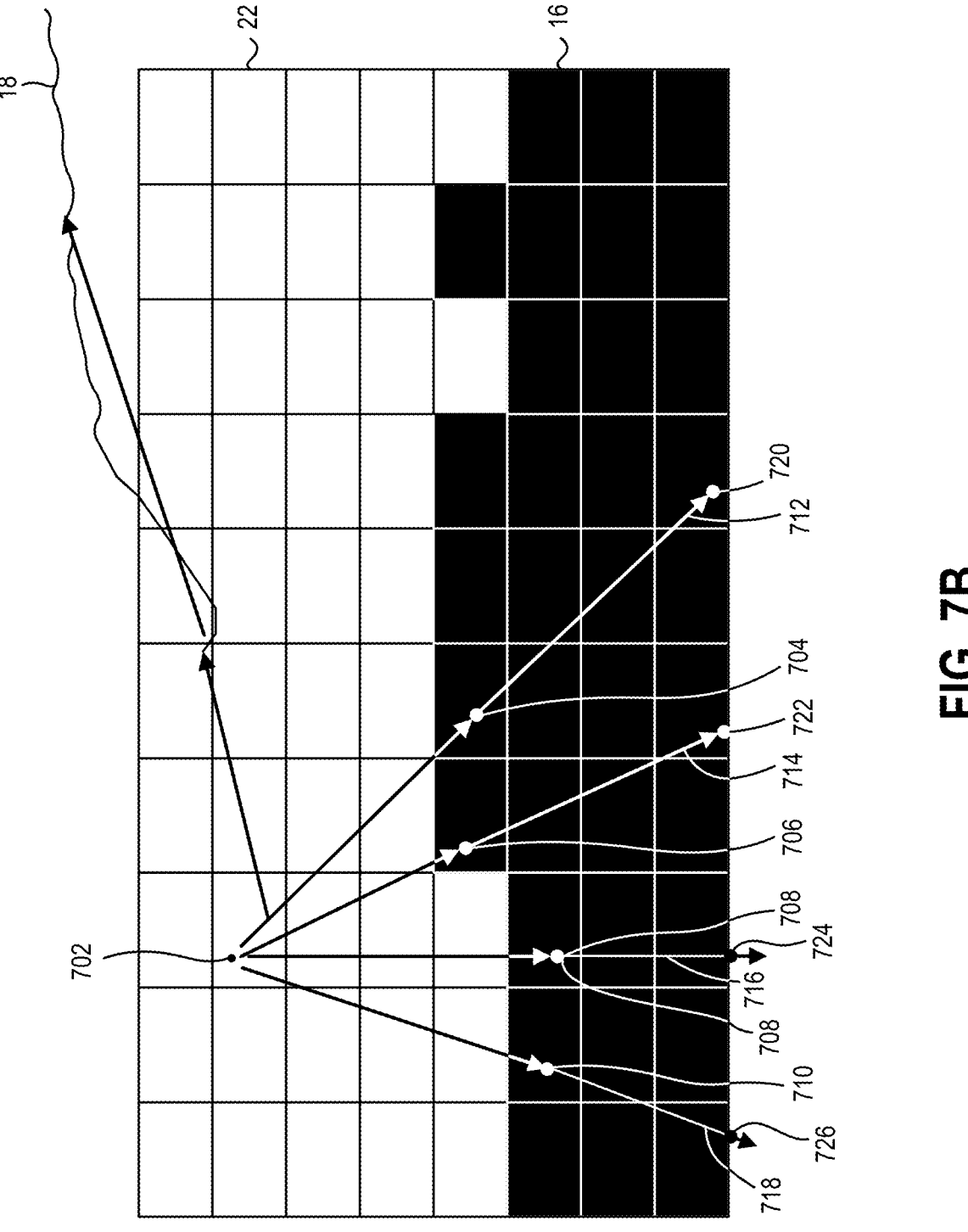
FIG. 7B illustrates an example of slop-based extrapolation of values for different datapoints in a blend region from a plurality of nearest datapoints in a dataset in accordance with some implementations of the present disclosure.

Referring now to FIG. 7B, illustrated is an example of extrapolating data for the datapoint 702 in the blend region 22 from the plurality of nearest datapoints 704, 706, 708, 710 in the second dataset 16 by continuing to extend rays 712, 714, 716, 718 a distance into the second dataset 16 and calculating a slope value for the datapoints 704, 706, 708, 710. An elevation difference is computed between the nearest datapoints 704, 706, 708, 710 and the end of the rays 712, 714, 716, 718 to provide a general slope value for each of the nearest datapoints 704, 706, 708, 710. The slope value computed at each of the nearest datapoints 704, 706, 708, 710 is used to extrapolate a value at the datapoint 702 by taking the known value at each of the nearest datapoints 704, 706, 708, 710 and continuing at that slope until reaching the datapoint 702. Each of the extrapolated values computed from the rays to the nearest datapoints 704, 706, 708, 710 is averaged to compute an extrapolated height for the datapoint 702 in the blend region 22.

The rays 712, 714, 716, 718 may be extended in the same direction from the datapoint 702. In addition, by extending the rays 712, 714, 716, 718 a further distance into the second dataset 16, the slope value may more accurately reflect the actual terrain by having more elevation information for the datapoints 704, 706, 708, 710, and resulting in smoother data for the slope values.

Figure 8:
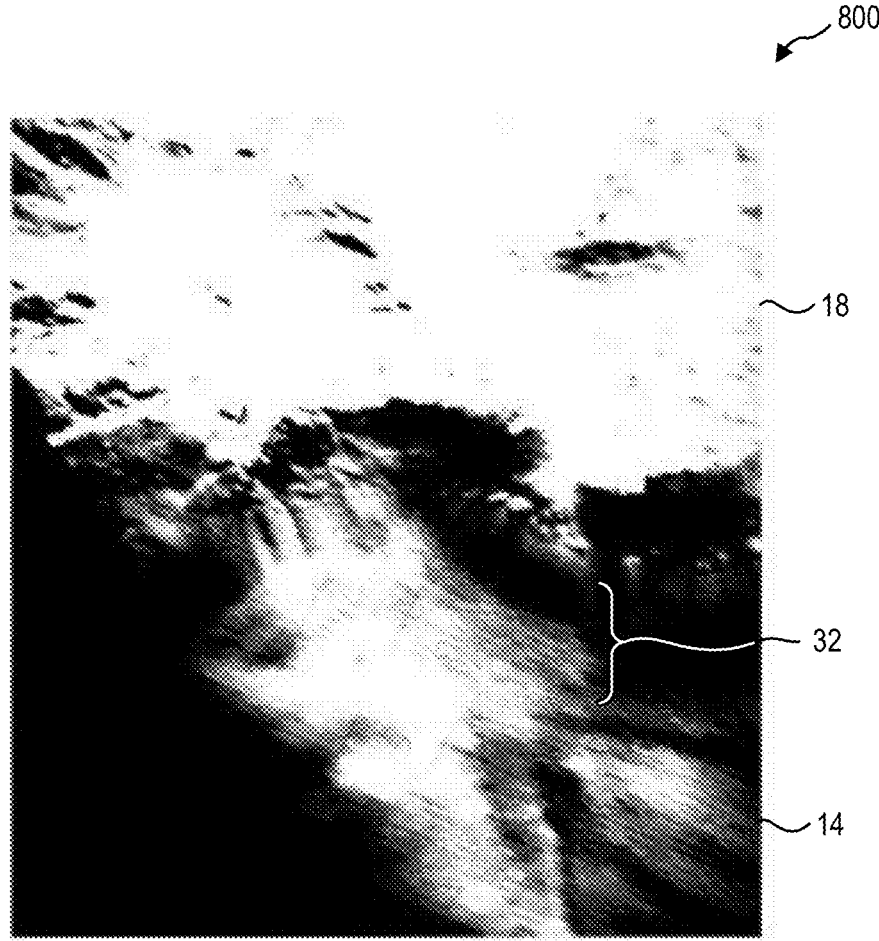
FIG. 8 illustrates an image where a slope value of a plurality of nearest datapoints is used for extrapolating data in the blend region in accordance with some implementations of the present disclosure.

Referring now to FIG. 8, illustrated is an example image 800 of terrain with a steep elevation change between the elevation data 18 for the second dataset 16 and the elevation data 14 for the first dataset 12. For example, the elevation data 18 for the geographic data from the second dataset 16 is higher relative to the elevation data 14 of the first dataset 12. As such, an incline or rise (e.g., a hill, mountain, or cliff) may occur in the terrain between the first dataset 12 and the second dataset 16.

The slope value of the average of the nearest datapoints (e.g., 704, 706, 708, 710) of the elevation data 18 in the second dataset 16 is used to create the blended data 32 in the blend region 22. As such, the blended data 32 gradually changes the elevation from the second dataset 16 to the first dataset 12 (e.g., the slope or decline) without having a sharp rise or change in the elevation.

Figure 9B:
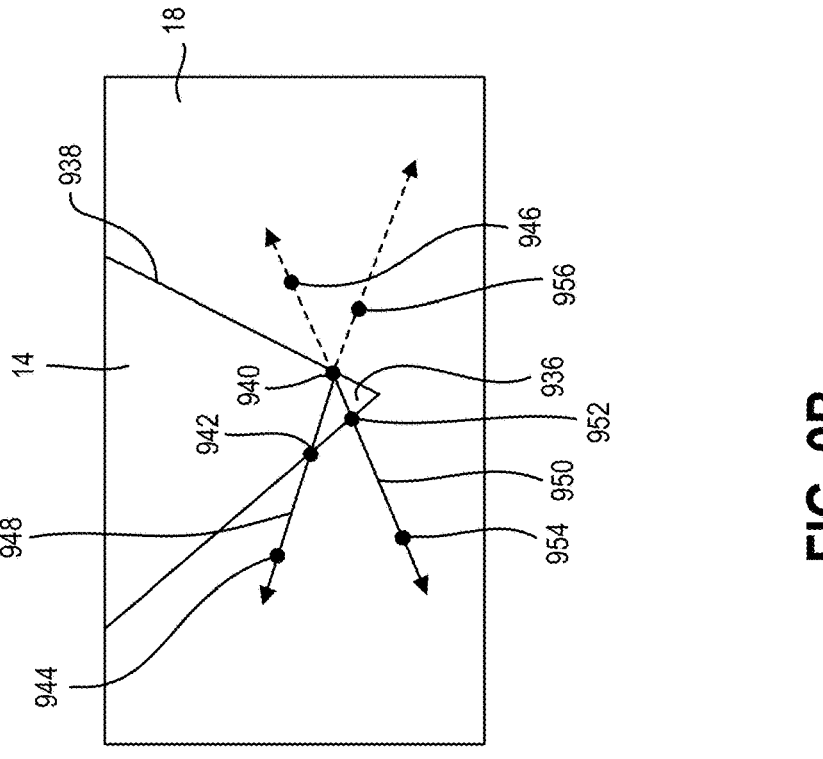
FIG. 9B illustrates an example of filling in a corner of a region between a geographic data in accordance with some implementations of the present disclosure.
Figure 9A:
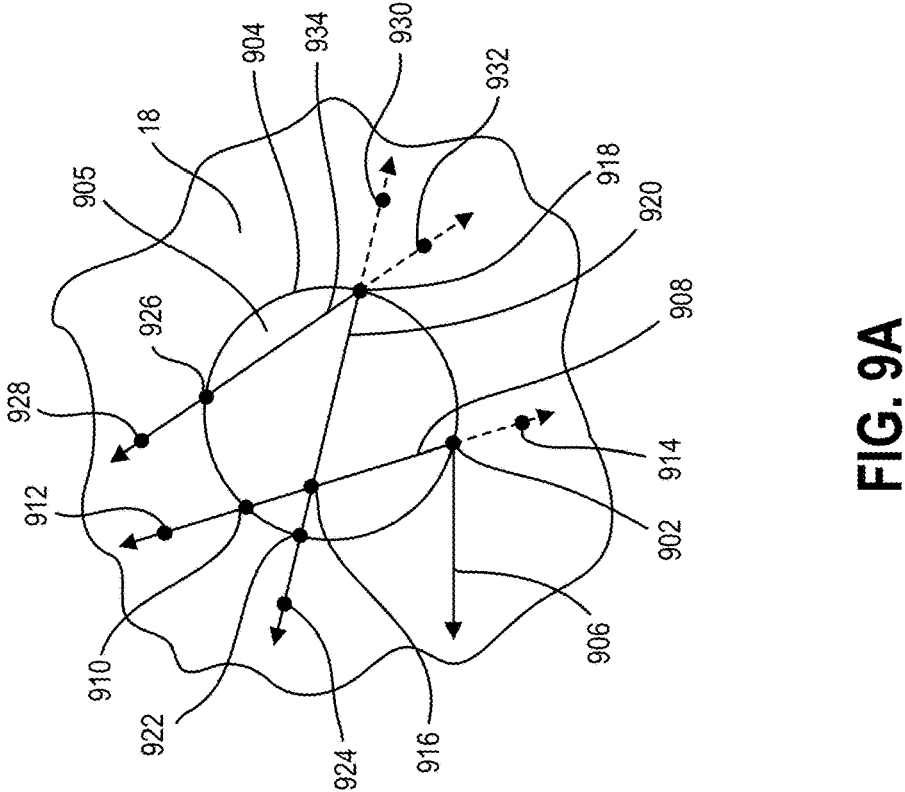
FIG. 9A illustrates an example of filling a gap in the geographic data in accordance with some implementations of the present disclosure.

Referring now to FIG. 9A, illustrated is an example of filling a gap 905 in the geographic data (e.g., elevation data 18) for the second dataset 16 with geographic data extrapolated from the second dataset 16 or estimated based on the geographic data from the second dataset 16. The gap 905 may occur from missing elevation data 18 or from incomplete geographic data. For example, geographic data may not have been collected (e.g., the surface did not reflect the elevation data) or obtained (e.g., the area was not included in the dataset). The elevation data 18 may surround the gap 905 and an edge 904 of the gap 905 and a plurality of datapoints on the edge 904 of the gap 905 in the elevation data 18 are identified. In an implementation, the datapoints on the edge 904 of the hole are pixels in the elevation data 18 of the second dataset 16.

For each datapoint on the edge 904, a plurality of rays are sent out the distance of the blend region 22 until the rays hit another datapoint on the edge 904 or extend further than the blend region 22. For example, a datapoint 902 is identified on the edge 904 and two rays 906, 908 are sent out from the datapoint 902. The ray 906 does not make contact with another datapoint on the edge 904, as such, the ray 906 is discarded and additional information from the ray 906 is not collected. The ray 908 makes contact with another edge datapoint 910 across the gap 905. The direction of the ray 908 is extended further into the elevation data 18 past the edge datapoint 910 and another datapoint 912 is identified in the elevation data 18 across the gap 905. In addition, the ray 908 is extended backwards from the edge datapoint 902 into the elevation data 18 in the direction of the ray 908 to identify another datapoint 932 in the elevation data 18. The elevation values from the four datapoints (the two edge datapoints 902, 910 and the two datapoints 912, 914 in the elevation data) are used to fill in elevation values along the ray 908. For example, a cubic interpolation is used to provide values for every datapoint along the ray. Another example includes using a linear interpolation to provide values for every datapoint along the ray. Cubic interpolations may be used for gaps or holes that have significant elevation changes on each end of the ray, while linear interpolations may be used when each endpoint of the ray is close in elevation. As such, the interpolation may be selected based on the elevation difference between the edge datapoint 902 and the edge datapoint 910. The elevation values from for the ray 908 are stored with the edge datapoint 902.

Another edge datapoint 918 is identified and two rays 920, 934 are sent out from the datapoint 918. The ray 920 hits another edge datapoint 922 across the gap 905. The direction of the ray 920 is extended further into the elevation data 18 past the edge datapoint 922 and another datapoint 924 is identified in the elevation data 18 in the direction of the ray 920, and the ray 920 is extended backwards from the edge datapoint 918 into the elevation data 18 and another datapoint 930 is identified in the elevation data 18. The elevation values from the four datapoints (the two edge datapoints 918, 922 and the two datapoints 924, 930 in the elevation data) are used to fill in elevation values along the ray 920. For example, a cubic interpolation is used to provide values for every datapoint along the ray. Another example includes using a linear interpolation to provide values for every datapoint along the ray. In addition, an intersection point 916 may be identified where the ray 908 and the ray 920 cross.

The elevation data from the ray 908 for the intersection point 916 may be averaged with the elevation data from the ray 920 and stored as the elevation data for the intersection point 916. The elevation data for the intersection point (e.g., the intersection point 916) may also be determined by using mode, median, and/or mean from the elevation data of the plurality of rays (e.g., the rays 908, 920) that cross at the intersection point. By having multiple rays cover the same intersection point (e.g., intersection point 916), the estimate of the elevation data for the gap 905 may improve by using the elevation data from the plurality of rays in determining the elevation data for the intersection point.

The second ray 934 makes contact with another edge datapoint 926 across the gap 905. The ray 934 is extended past the edge datapoint 926 into the elevation data 18 and another datapoint 928 is identified in the elevation data 18 in the direction of the ray 934, and the ray 934 is extended backwards from the edge datapoint 918 into the elevation data 18 and another datapoint 932 is identified in the elevation data 18. The elevation values from the four datapoints (the two edge datapoints 918, 926 and the two datapoints 926, 932 in the elevation data) are used to fill in elevation values along the ray 934. For example, a cubic interpolation is used to provide values for every datapoint along the ray. Another example includes using a linear interpolation to provide values for every datapoint along the ray. The elevation values from the rays 920, 934 are stored with the edge datapoint 918.

The elevation values for the different edge datapoints (e.g., edge datapoints 902, 918) are used to fill in the gap 905 with extrapolated and/or estimated elevation data. While two edge datapoints (e.g., edge datapoints 902, 918) are illustrated, the method may continue for all of the edge datapoints along the edge 904 of the gap 905 or a subset of the edge datapoints along the edge 904 of the gap 905. In addition, while two rays are illustrated any number of rays may be used. The degree increment between the rays may change based on the size of the gap 905, the distance of the blend region 22, and/or other factors, such as the geographic data. The gap 905 may be smoothly filled in with extrapolated elevation data based on the elevation data 18 from different rays (e.g., rays 908, 920, 934).

Referring now to FIG. 9B, illustrated is an example of a corner in the geographic data (e.g., elevation data 18) for the second dataset 16 where a gap occurs between the geographic data of the second dataset 16. For example, an acute angle may create a corner or region 936 with high frequency data (e.g., elevation data 18) on each sides of a corner and lower frequency data (e.g., elevation data 14) in the region 936 between. As such, the region 936 includes geographic data from a first dataset 12 between areas with geographic data from a second dataset 16. The region 936 between the second dataset 16 may be filled with geographic data extrapolated from the geographic data from the second dataset 16. A similar method as discussed in FIG. 9A is used to extrapolate the geographic data from the second dataset 16 to fill the region 936 with geographic data.

For example, an edge 938 of the region 936 is identified. An edge datapoint 940 is selected and two rays 948, 950 are sent from the edge datapoint 940 across the region 936. The ray 948 makes contact with another edge datapoint 942. The ray 948 extends further into the elevation data 18 past the edge datapoint 942 and another datapoint 944 is selected in the elevation data 18 along the direction of the ray 948 and the ray 948 is also extended backwards from the edge datapoint 940 into the elevation data 18 and another datapoint 946 is selected in elevation data 18. The elevation values from the four datapoints (the two edge datapoints 940, 942 and the two datapoints 944, 946 in the elevation data 18) are used to fill in elevation values along the ray 948. For example, a cubic interpolation is used to fill in the elevation values along the ray 948. Another example includes using a linear interpolation to provide values along the ray 948.

The second ray 950 makes contact with another edge datapoint 952 across the region 936. The ray 950 extends past the edge datapoint 952 further into the elevation data 18 and another datapoint 954 is identified in the elevation data 18, and the ray 950 is extended backwards from the edge datapoint 940 into the elevation data 18 and another datapoint 956 is identified in the elevation data 18. The elevation values from the four datapoints (the two edge datapoints 940, 952 and the two datapoints 954, 956 in the elevation data) are used to fill in elevation values along the ray 934. For example, a cubic interpolation is used to provide values for every datapoint along the ray. Another example includes using a linear interpolation to provide values for every datapoint along the ray. The elevation values for the ray 950 and the elevation values for the ray 948 are stored with the edge datapoint 940 and used to fill in the region 936 with extrapolated data from the elevation data 18 for the second dataset 16.

The elevation values for the different edge datapoints (e.g., edge datapoint 940) are used to fill in the region 936 with elevation data extrapolated from the elevation data 18. While one edge datapoint (e.g., edge datapoints 940) is illustrated, the method may continue for all of the edge datapoints on the edge 938 of the region 936 or a subset of the edge datapoints on the edge 938 of the region 936. In addition, while two rays are illustrated any number of rays may be used. The region 936 may be smoothly filled in with blended data elevation data estimated based on the elevation data from the different rays (e.g., rays 908, 920, 934), resulting in smoother transitions at corners and/or angles between two regions with different datasets.

Figure 10:
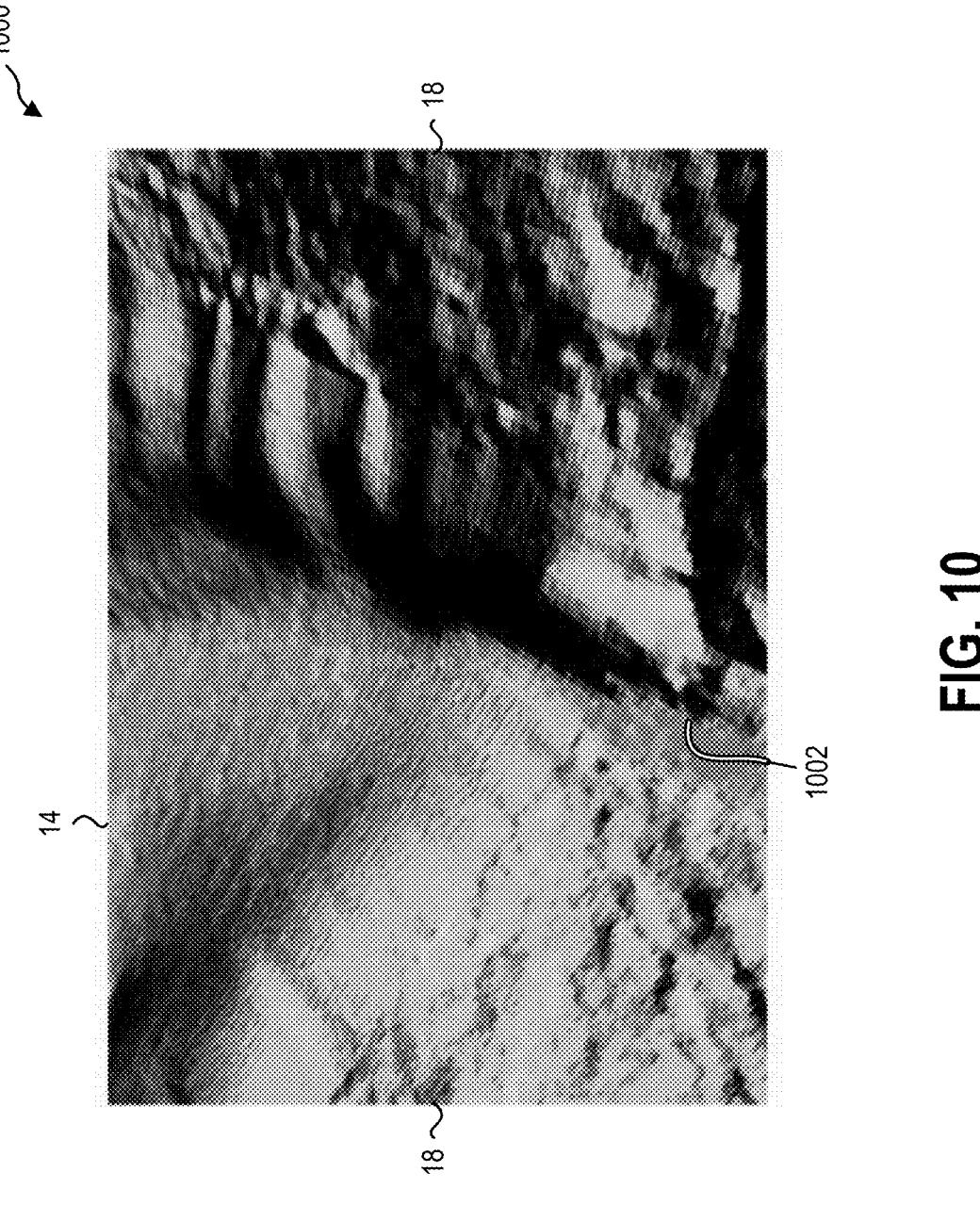
FIG. 10 illustrates an image where the corner of a region between the geographic data is filled in accordance with some implementations of the present disclosure.

Referring now to FIG. 10, illustrated is an image 1000 illustrating a corner 1002 between two areas of elevation data 18 (e.g., from the second dataset 16) with elevation data 14 (e.g., from the first dataset 12). The elevation data 18 may be high frequency data and the elevation data 14 may be lower frequency data. The corner 1002 smoothly transitions between the elevation data 18 and the elevation data 14. For example, the method discussed in FIG. 9B is used to extrapolate the elevation data for the corner 1002 resulting in a smoother transition in the image 1000 between the elevation data 18 and the elevation data 14.

Figure 11:
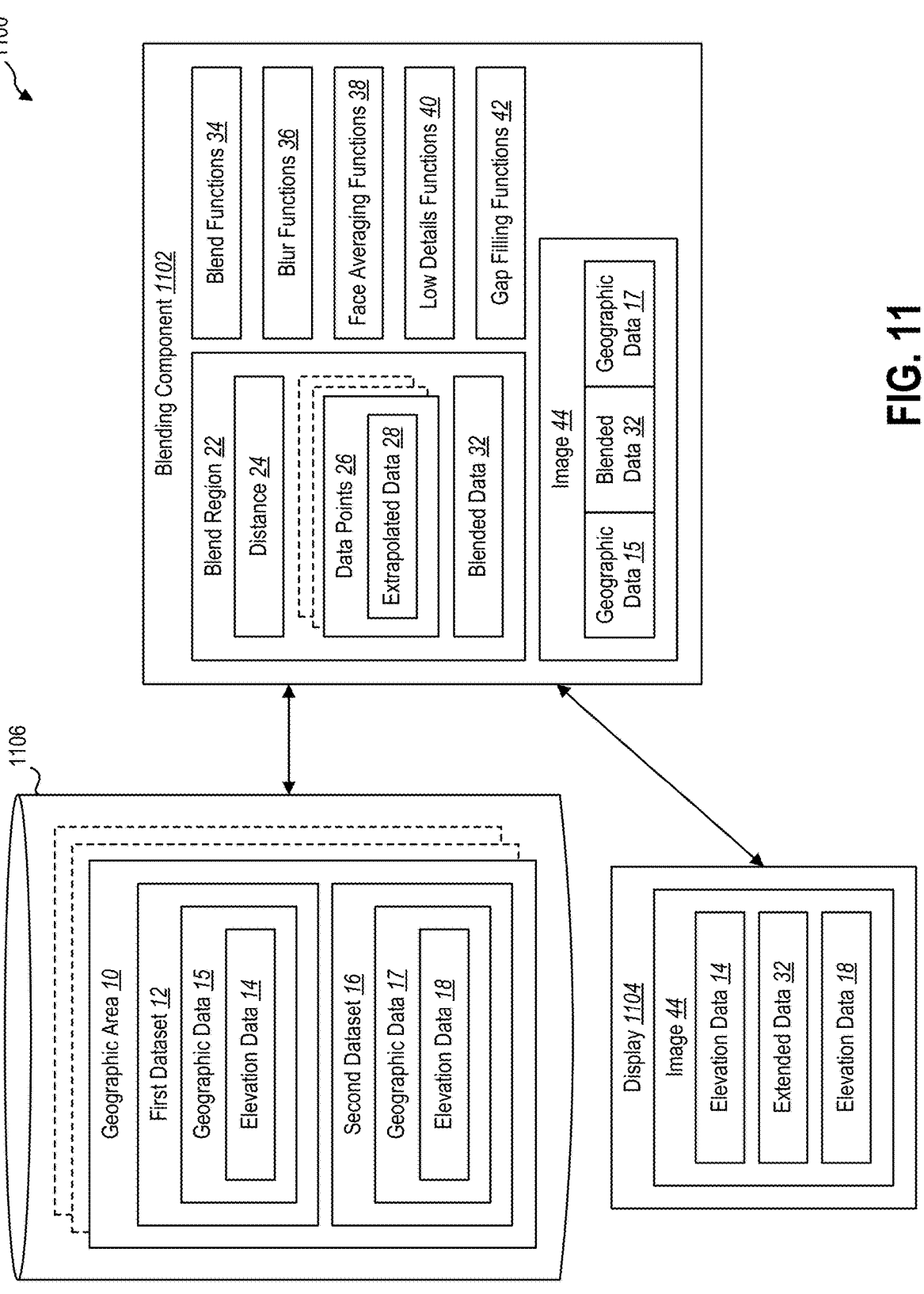
FIG. 11 illustrates an example environment for blending geographic data in accordance with some implementations of the present disclosure.

Referring now to FIG. 11, illustrated is an example environment 1100 for use with blending geographic data from different datasets. Environment 1100 may include a plurality of datastores 1106 with a plurality of datasets (e.g., a first dataset 12 and a second dataset 16) with geographic data (e.g., geographic data 15, 17) for one or more geographic areas 10. The first dataset 12 and the second dataset 16 may be stored in the same datastore 1106. In addition, the first dataset 12 and the second dataset 16 may be stored in different datastores 1106 (e.g., the first dataset 12 in one datastore and the second dataset 16 in a different datastores). In some implementations, different datastores 1106 may store datasets from different sources. For example, one datastore stores datasets from radar derived datasets, while a different datastore stores datasets from optical sources, and another datastores stores datasets from laser derived sources. The geographic data 15, 17 may include digital images with elevation data 14, 18 for the terrain of the geographic area 10. The elevation data 14, 18 may be represented by a two-dimensional bitmap including pixels, where each pixel has an x, y cartesian coordinate and an elevation value relative to some geodata datum (ellipsoid, geoid) for the geographic area 10. The elevation data 14, 18 may also be represented by specifying an x, y, z vertex for each data sample. For example, the first dataset 12 is a global set of geographic data 15 with elevation data 14 obtained from radar derived sources (e.g., SRTM) and the second dataset 16 is a local set of geographic data 17 with elevation data 18 obtained from laser (e.g., LiDAR) and/or optical sources. The geographic data 15 of the first dataset 12 may have a lower resolution as compared to the geographic data 17 of the second dataset 16. As such, the first dataset 12 and the second dataset 16 are discontinuous based on the differences in the resolution of the two datasets.

Another example includes the first dataset 12 including a set of geographic data 15 obtained at a first time period for a portion of the geographic area 10, and the second dataset 16 includes a set of geographic data 17 obtained at a second time period for another portion of the geographic area 10, where the different datasets are discontinuous and do not cover the same portions or regions of the geographic area 10. The first time period may be before the second time period (e.g., two years earlier). In addition, the geographic data 15, 17 may have been obtained by the same source (e.g., both obtained by LiDAR), and thus, may have similar data resolutions. For example, a survey is performed by LiDAR of a city occurred in 2015 and the data from the survey is provided as the geographic data 15 for the first dataset 12. Another survey of the city is performed by LiDAR in 2021 and the data from the survey is provided as the geographic data 17 for the second dataset 16.

The different datasets may have geographic data with varying resolutions, geographic data with the same resolutions, and/or geographic data with various coverage of the geographic area 10.

A blending component 1102 may access and/or receive the first dataset 12 and/or the second dataset 16 from the one or more datastores 1106 and smoothly match a region or area of the geographic area 10 covered by the first dataset 12 with a region or area of the geographic area 10 covered by the second dataset 16 by blending the geographic data 15 from the first dataset 12 and the geographic data 17 from the second dataset 16 together.

The blending component 1102 may identify a blend region 22 between the end or edge of the second dataset 16 and the first dataset 12 to blend the geographic data 17 of the second dataset 16 and the geographic data 15 of the first dataset 12 together to create blended data 32. The blended data 32 transitions between the different geographic data. For example, the blend region 22 may blend high frequency geographic data (e.g., high frequency elevation data 18 of the second dataset 16) and low frequency geographic data (e.g., low frequency elevation data 14 of the first dataset 12) together, resulting in blended data 32 that provides a smooth transition between the high frequency geographic data and the low frequency geographic data. Another example includes the blend region 22 making a smooth transition between discontinuous data (e.g., the first dataset 12 covers a portion of the geographic area 10 and the second dataset 16 covers a different non-overlapping portion of the geographic area 10) by using blended data 32 for the transition.

The blending component 1102 may identify a distance 24 of the blend region 22. The distance 24 may be based on the difference between the resolutions of the different datasets. For example, if the difference in resolution is high (e.g., the geographic data 17 has high detailed data and the geographic data 15 has low detailed data), a longer blend distance is used for the distance 24. If the difference is resolution is low or minimal (e.g., the geographic data 17 has a similar resolution as the geographic data 15), a shorter blend distance is used for the distance 24. As such, different distances 24 may be selected for different datasets of geographic data.

Geographic data 17 for the second dataset 16 may be missing in the blend region 22. The blending component 1102 may create geographic data and/or extrapolate geographic data from the geographic data 17 of the second dataset 16 to appear like realistic geographic data for the terrain or look like realistic geographic data for the terrain in the blend region 22. The blending component 1102 may use the estimated and/or the extrapolated data 28 for the blend region 22 to create the blended data 32.

The blending component 1102 may identify a plurality of datapoints 26 in the blend region 22 and may use a plurality of methods for extrapolating data 28 for the plurality of datapoints 26. In some implementations, all the datapoints 26 in the blend region 22 include extrapolated data 28. In some implementations, a subset of the datapoints 26 in the blend region include extrapolated data 28.

One method for extrapolating data for datapoints 26 in the blend region 22, is to identify a nearest datapoint (nearest neighbor) in the second dataset 16 and extrapolate the geographic data 17 from the nearest datapoint in the second dataset 16 for the value of the datapoint in the blend region 22. For example, the blending component 1102 may identify a nearest pixel (e.g., the pixel nearest in distance to the datapoint 26) in the elevation data 18 of the second dataset 16 and may assign the elevation data 18 from the nearest pixel as the extrapolated data 28 value for the datapoint 26 in the blend region 22. As such, the extrapolated data 28 has the same elevation data as the nearest neighbor in the second dataset 16.

Another method for extrapolating the data for the datapoints 26 in the blend region 22 is identifying a plurality of nearby datapoints (e.g., n neighbors, where n is an integer) in the second dataset 16 and taking an average of the geographic data 17 for the plurality of nearby datapoints. For example, the plurality of datapoints are pixels on a slope of the elevation data 18 of the geographic data 17. The average of the elevation data 18 is assigned as the extrapolated data 28 value for the datapoint 26 in the blend region 22. Any number of nearby datapoints (e.g., neighbors) may be used for the data extrapolation. For example, the blending component 1102 may identify four nearest pixels (e.g., the pixels of the four nearest neighbors in distance to the datapoint 26) in the elevation data 18 of the second dataset 16 and may assign the average elevation data 18 from the four nearest pixels as the extrapolated data 28 value for the datapoint 26 in the blend region 22. As such, the extrapolated data 28 has the average of the elevation data 18 from four nearest neighbors in the second dataset 16. By averaging the elevation data 18 from a plurality of datapoints in the second dataset 16, smoother transitions between the first dataset 12 and the second dataset 16 may be created in the blend region 22.

Another method for extrapolating the data for the datapoints 26 in the blend region 22 is calculating slope values of the plurality of nearby datapoints (e.g., n neighbors, where n is an integer) identified in the second dataset 16 and using the slope values in averaging the geographic data 17 for the plurality of nearby datapoints for the extrapolated data 28. The slope value may be an elevation difference between the nearby datapoint and another datapoint a distance on a ray from the nearby datapoint. The average of the slope values for the nearest datapoints (e.g., nearest neighbors) is provided as the extrapolated data 28 value for the datapoints 26 in the blend region 22. The slope values may more accurately reflect the elevation of the actual terrain, resulting in smoother data transitions between datasets that include hills, mountains, valleys, or other sloping terrain.

Another method for creating the blended data 32 is to average the extrapolated data 28 for the datapoints 26 in the blend region 22 with an average of the slope values for the first dataset 12. The slope values may be calculated for a plurality of datapoints in the geographic data 15 of the first dataset 12. For example, a plurality of datapoints in the first dataset 12 are identified for the blend region 22 and a slope value for each of the plurality of datapoints is calculated (e.g., an elevation difference between the datapoint and another datapoint a distance on a ray from the datapoint). The average of the slope values may be averaged together with the extrapolated data 28 to create the blended data 32.

The blending component 1102 may apply one or more blend functions 34 to blend the extrapolated data 28 for the plurality of datapoints 26 in the blend region 22 with the geographic data 15 from the first dataset 12 to create blended data 32. The blended data 32 transitions between the end of the second dataset 16 to the first dataset 12 while maintaining information provided by the geographic data of the second dataset 16. The blended data 32 provides a smooth transition between the second dataset 16 and the first dataset 12 at the end of the sample region of the second dataset 16.

One example of the blend function 34 is a linear blend function to generate the blended data 32 with the geographic data from the first dataset 12. The linear blend function is applied to the extrapolated data 28 for the datapoints 26 in the blend region 22 and takes a weighted average based on the distance of the extrapolated data 28 to the nearest known value(s) in the geographic data 15 from the first dataset 12 and creates a straight line with the blended data 32 transitioning from the end of the second dataset 16 to the first dataset 12. For example, the linear function takes the weighted average of the elevation data in the extrapolated data 28 for the datapoints 26 and the elevation data 14 of the first dataset 12 and uses the weighted average for the blended data 32.

Another example of the blend function 34 is a cosine function. The cosine function is applied to the extrapolated data 28 for the datapoints 26 in the blend region 22 and takes a weighted average of the cosine values based on the distance between the extrapolated data 28 and the nearest known value(s) in the geographic data 15 from the first dataset 12 to generate the blended data 32. For example, the cosine function takes the cosine values of the elevation data in the extrapolated data 28 for the datapoints 26 and the elevation data 14 of the first dataset 12 and uses the cosine values for the blended data 32. As such, a curved line is created with the blended data 32 easing the transition between the end of the second dataset 16 and the first dataset 12.

Other examples of the blend functions 34 include any higher order function that has continuous derivatives at the endpoints, such as, higher order polynomials functions or logarithmic functions.

The blending component 1102 may also apply one or more blur functions 36 to the blended data 32 to smooth out or remove noise that may be present in the blended data 32. For example, the extrapolated data 28 used in generating the blended data 32 may have high frequency noise. Noise may be shown in an image with the blended data 32 by various bumps or artifacts in the image. One example blur function 36 is a blur kernel that applies a gaussian blur to a radius in the blended data 32. Other blur kernels may be applied to the blended data 32 to smooth out and/or remove the high frequency noise in the blended data 32. The blending component 1102 may determine one or more variable radiuses in the blended data 32 to apply the gaussian blur. The radius of the blur increases in the blended region 22 as the distance of the extrapolated value from the nearest known value increases, and thus, removing the high frequency detail farther out in the blend region 22 while maintaining more of the high frequency detail closer in the blend region 22.

For each radius, the blending component 1102 determines the datapoints 26 in the blended data 32 within the selected radius, takes an average of the values for the datapoints 26, and assigns the average to the value of the datapoints 26 in the radius. By applying a blur kernel, such as, a gaussian blur, to different areas of the blended data 32, the pixels in the blended data 32 may be flattened to an average, and thus, removing noise present in the blended data 32.

The blending component 1102 may also apply one or more face averaging functions 38 to the blended data 32 to average and/or flatten out any noise that is present in the blended data 32. The face averaging function 38 may turn the blended data 32 into a three dimensional polygon mesh, where each pixel of the blended data 32 has a cartesian x, y, z value, where the x and y value are derived from the pixel position and the z value is derived from the elevation value (e.g., the elevation value from the extrapolated data 28). A normal averaging technique is applied at each vertex of the three dimensional polygon mesh by computing the normals for each face and for each vertex. The normals are used to determine whether to move each vertex forward or backward along the vertex normal so that the resulting face normal for each face sharing that vertex will move towards the average normal of all faces surrounding that vertex. The normal calculation is repeated for each vertex of the three dimensional polygon mesh for a number of iterations. The face averaging functions 38 may result in bumps (e.g., noise) in an image of the blended data 32 flatten out, resulting in a smoother image of the blended data 32.

The blending component 1102 may also apply one or more low details functions 40 to the blended data 32. The low details functions 40 may use lower resolutions of the blended data 32 to provide consistent data if using lower details in a sample set to provide consistent data.

The blending component 1102 may also apply one or more gap filling functions 42 to the blended data 32, the second dataset 16, and/or the first dataset 12. The gap filling functions 42 may fill in any gaps and/or holes (e.g., missing data, incomplete data) with extrapolated data and/or estimated data. In addition, the gap filling functions 42 may smooth out corners and/or angles where the geographic data 15, 17 may be missing. One or more methods may be used for the gap filling functions 42.

As such, the blending component 1102 may apply one or more blend functions 34, blur functions 36, face averaging functions 38, low details functions 40, and/or gap filling functions 42, or any combination thereof, to the blended data 32 to smoothly match between the first dataset 12 and/or the second dataset 16 so there is little visible difference between the two regions of the datasets.

The blending component 1102 may generate an image 44 with the geographic data 15 of the first dataset 12 and the geographic data 17 of the second dataset 16. The image 44 may be a bitmap with regularly spaced samples. The image 44 may also be in other formats with eighter regular or irregularly spaced samples. The image 44 also has the blended data 32 in the blend region 22 between the geographic data 15 and the geographic data 17. In one example, the geographic data 15 includes elevation data 14 and the geographic data 17 includes elevation data 18. As such, the image 44 includes the elevation data 14 of the first dataset 12 and the elevation data 18 of the second dataset 16 with the blended data 32 in between.

The blending component 1102 may cause the image 44 to be presented on one or more displays 104 in communication with the blending component 1102. For example, the display 104 is on a device a user is using to request a map of the geographic area 10 and the blending component 1102 sends image 44 for the map of terrain of the geographic area 10. For example, the map may be presented with the terrain of a city. The geographic data 17 from the second dataset 16 may include higher resolution elevation data 18 for a portion of the city and the geographic data 15 may include lower resolution elevation data 14 for the entire city. As such, the map may present an image with the higher resolution elevation data 18 for the portion of the city covered by the geographic data 17 of the second dataset 16, while presenting the lower resolution elevation data 14 for the remaining portions of the city covered by the geographic data 15 of the first dataset 12. The map also includes blended data 22 smoothly transitioning between the high resolution elevation data 18 and the low resolution elevation data 14.

Another example of the display 104 includes a display of a device a user is using a flight simulator application on and the image 44 is sent to show the terrain of the geographic area 10 in the flight simulator. Another example of the display 104 includes an AR/VR device display and the blending component 1102 sends image 44 to show the terrain of the geographic area 10 around the device. Another example of the display 104 is a mobile device display and the image 44 is sent for turn for a turn by turn navigation application to provide the user with the image 44 of the terrain the user is driving through.

In some implementations, one or more computing devices (e.g., servers and/or devices) are used to perform the processing of environment 1100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the datastores 1106 and the blending component 1102 is implemented wholly on the same computing device. Another example includes one or more subcomponents of the datastores 1106 and/or the blending component 1102 are implemented across multiple computing devices. Moreover, in some implementations, the datastores 1106 and/or the blending component 1102 may be implemented are processed on different server devices of the same or different cloud computing networks.

In some implementations, each of the components of the environment 1100 is in communication with each other using any suitable communication technologies. In addition, while the components of the environment 1100 are shown to be separate, any of the components or subcomponents may be combined into fewer components, such as into a single component, or divided into more components as may serve a particular implementation. In some implementations, the components of the environment 1100 include hardware, software, or both. For example, the components of the environment 1100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 1100 include hardware, such as a special purpose processing device to perform a certain function or group of functions. In some implementations, the components of the environment 1100 include a combination of computer-executable instructions and hardware.

As such, environment 1100 is used to provide better terrain visualization that smoothly matches two different regions of geographic data, so it is as invisible as possible between the two regions. Environment 1100 provides a single seamless elevation model by mapping the elevation data from different datasets together smoothly while transitioning between the elevation data received.

Figure 12:
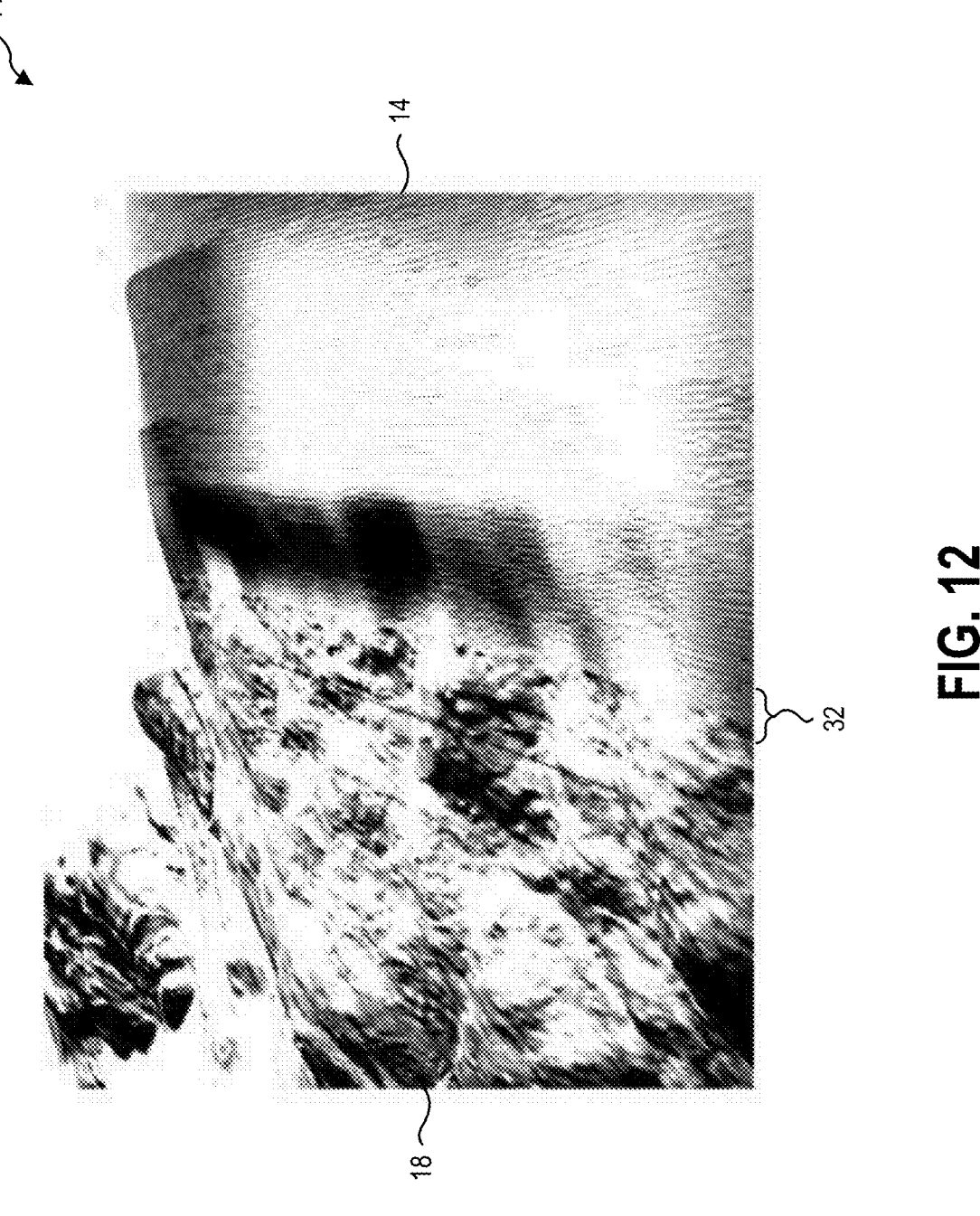
FIG. 12 illustrates an example image with elevation data in accordance with some implementations of the present disclosure.

Referring now to FIG. 12, illustrated is an example map image 44 presented on a display 1104 (FIG. 11). Image 44 has one region with elevation data 18 that is high frequency, high confidence data. Image 44 has another region with elevation data 14 that is low frequency, low confidence data. In between, the blended data 32, smoothly matches the two regions so that the transition between the two regions is barely visible in image 44. Moreover, the slope in the elevation in the transition between the two regions is maintained with the blended data 32.

Figure 13:
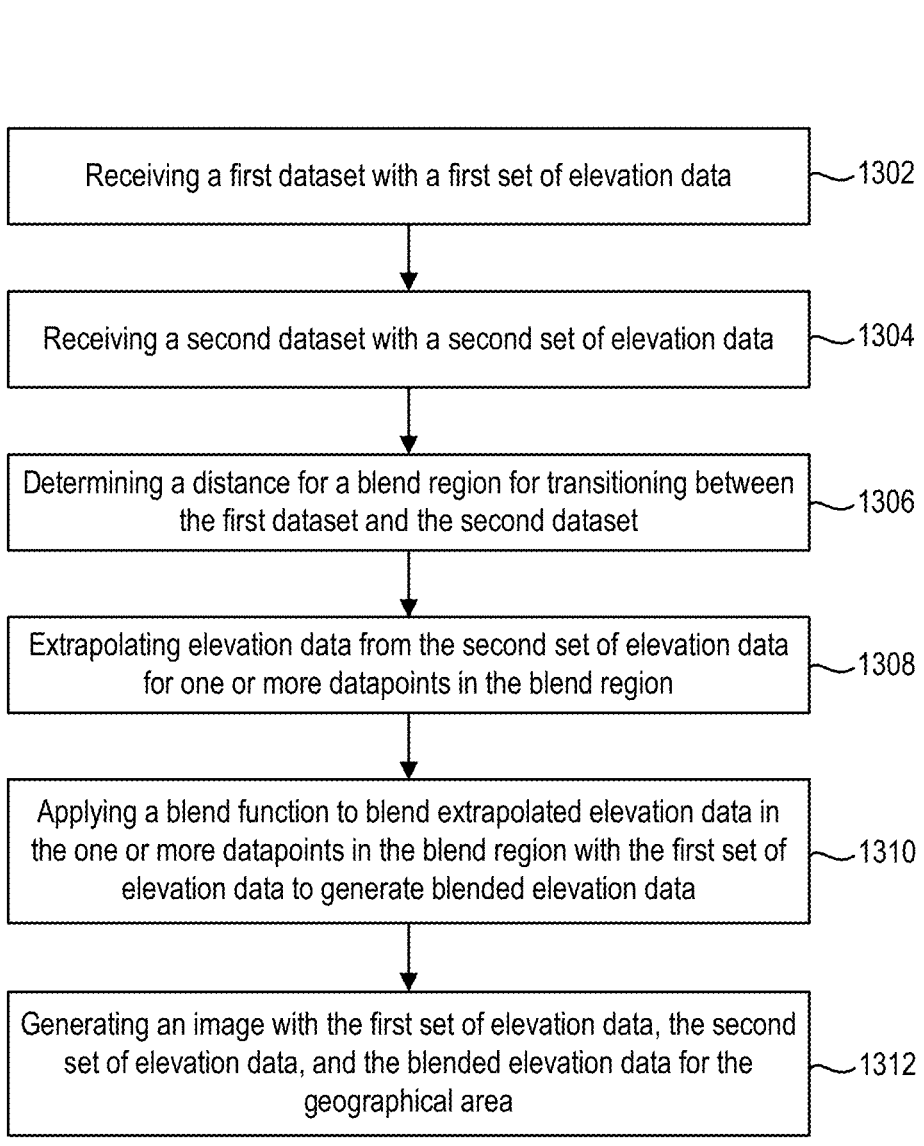
FIG. 13 illustrates an example method for blending elevation data in accordance with some implementations of the present disclosure.

Referring now to FIG. 13 illustrated is an example method 1300 for blending elevation data performed by one or more computing devices of environment 1100. The actions of the method 1300 are discussed below with reference to the architecture of FIG. 11 but may be applicable to other specific environments.

At 1302, the method 1300 includes receiving a first dataset with a first set of elevation data. A blending component 1102 may access and/or receive the first dataset 12 from the one or more datastores 1106. For example, the first dataset 12 is a global set of geographic data 15 with elevation data 14 from radar derived sources (e.g., SRTM). In another example the first dataset 12 includes a set of geographic data 15 obtained at a first time period for a portion of the geographic area 10.

At 1304, the method 1300 includes receiving a second dataset with a second set of elevation data. A blending component 1102 may access and/or receive the second dataset 16 from the one or more datastores 1106. For example, the second dataset 16 is a local set of geographic data 17 with elevation data 18 obtained from laser (e.g., LiDAR) and/or optical sources. In another example the second dataset 16 includes a set of geographic data 17 obtained at a second time period for another portion of the geographic area 10.

At 1306, the method 1300 includes determining a distance for a blend region for transitioning between the first dataset and the second dataset. The blending component 1102 may identify a blend region 22 between the end or edge of the second dataset 16 and the first dataset 12 to blend the geographic data 17 of the second dataset 16 and the geographic data 15 of the first dataset 12 together for transitioning between the different geographic data. For example, the blend region 22 may blend high frequency geographic data (e.g., high frequency elevation data 18 of the second dataset 16) and low frequency geographic data (e.g., low frequency elevation data 14 of the first dataset 12) together, resulting in blended data 32 that provides a smooth transition between the high frequency geographic data and the low frequency geographic data. Another example includes the blend region 22 making a smooth transition between the discontinuous data by using blended data 32 for the transition.

The blending component 1102 may identify a distance 24 of the blend region 22. The distance 24 may be based on the difference between the resolutions of the different datasets. For example, if the difference in resolution is high (e.g., the geographic data 17 has high detailed data and the geographic data 15 has low detailed data), a longer blend distance is used for the distance 24. If the difference is resolution is low or minimal (e.g., the geographic data 17 has a similar resolution as the geographic data 15), a shorter blend distance is used for the distance 24. As such, different distances 24 may be selected for different datasets of geographic data.

At 1308, the method 1300 includes extrapolating elevation data from the second set of elevation data for one or more datapoints in the blend region. The blending component 1102 may identify a plurality of datapoints 26 in the blend region 22 and may use a plurality of methods for extrapolating data 28 for the plurality of datapoints 26. In some implementations, all the datapoints 26 in the blend region 22 include extrapolated data 28. In some implementations, a subset of the datapoints 26 in the blend region include extrapolated data 28.

One method for extrapolating data for datapoints 26 in the blend region 22, is to identify a nearest datapoint (nearest neighbor) in the second dataset 16 and extrapolate the geographic data 17 from the nearest datapoint in the second dataset 16 for the value of the datapoint in the blend region 22. For example, the blending component 1102 may identify a nearest pixel (e.g., the pixel nearest in distance to the datapoint 26) in the elevation data 18 of the second dataset 16 and may assign the elevation data 18 from the nearest pixel as the extrapolated data 28 value for the datapoint 26 in the blend region 22.

Another method for extrapolating the data for the datapoints 26 in the blend region 22 is identifying a plurality of nearby datapoints (e.g., n neighbors, where n is an integer) in the second dataset 16 and taking an average of the geographic data 17 for the plurality of nearby datapoints. For example, the plurality of datapoints are pixels on a slope of the elevation data 18 of the geographic data 17. The average of the geographic data 17 is assigned as the extrapolated data 28 value for the datapoint 26 in the blend region 22. Any number of nearby datapoints (e.g., neighbors) may be used for the data extrapolation. For example, the blending component 1102 may identify four nearest pixels (e.g., the pixels of the four nearest neighbors in distance to the datapoint 26) in the elevation data 18 of the second dataset 16 and may assign the average elevation data 18 from the four nearest pixels as the extrapolated data 28 value for the datapoint 26 in the blend region 22. By averaging the elevation data 18 from a plurality of datapoints in the second dataset 16, smoother transitions between the first dataset 12 and the second dataset 16 may be created in the blend region 22.

Another method for extrapolating the data for the datapoints 26 in the blend region 22 is calculating slope values of the plurality of nearby datapoints (e.g., n neighbors, where n is an integer) identified in the second dataset 16 and using the slope values in averaging the geographic data 17 for the plurality of nearby datapoints for the extrapolated data 28. The slope value computed at each of the nearby datapoints in the geographic data 17 is used to extrapolate a value for a datapoint 26 by taking the known value at each of the nearby datapoints and continuing at that slope until reaching the datapoint 26. Each of the extrapolated values computed from the rays to the nearby datapoints is averaged to calculate an extrapolated height for the extrapolated data 28 for the datapoint 26 in the blend region 22. The slope values may more accurately reflect the elevation of the actual terrain, resulting in smoother data transitions between datasets that include hills, mountains, valleys, or other sloping terrain.

Another method for creating the blended data 32 is to average the extrapolated data 28 for the datapoints 26 in the blend region 22 with an average of the slope values for the first dataset 12. The slope values may be calculated for a plurality of datapoints in the geographic data 15 of the first dataset 12. For example, a plurality of datapoints in the first dataset 12 are identified for the blend region 22 and a slope value for each of the plurality of datapoints is calculated (e.g., an elevation difference between the datapoint and another datapoint a distance on a ray from the datapoint). The average of the slope values for the first dataset 12 may be averaged together with the extrapolated data 28 to create the blended data 32.

At 1310, the method 1300 includes applying a blend function to blend extrapolated elevation data in the one or more datapoints in the blend region with the first set of elevation data to generate blended elevation data. The blending component 1102 may apply one or more blend functions 34 to blend the extrapolated data 28 for the plurality of datapoints 26 in the blend region 22 with the geographic data 15 from the first dataset 12 for the blend region 22 to create blended data 32. The blended data 32 transitions between the end of the second dataset 16 to the first dataset 12 while maintaining information provided by the geographic data of the second dataset 16. The blended data 32 provides a smooth transition between the second dataset 16 and the first dataset 12 at the end of the sample region of the second dataset 16.

One example of the blend function 34 is a linear blend function to generate the blended data 32 with the geographic data from the first dataset 12. Another example of the blend function 34 is a cosine function. Other examples of the blend functions 34 include any continuous function, such as, but not limited to, higher order polynomials functions or logarithmic functions.

The method 1300 may optionally apply one or more blur functions 36 to the blended data 32 to smooth out or remove noise that may be present in the blended data 32. In addition, the method 1300 may optionally apply one or more one or more face averaging functions 38 to the blended data 32 to average and/or flatten out any noise that is present the blended data 32. The method 1300 may optionally remove a portion of the geographic data 15, 17 (e.g., data along a border of the geographic data 15, 17) to remove noise or inaccurate data. The method 1300 may optionally apply one or more low details functions 40 to the blended data 32. The method 1300 may optionally apply one or more one or more gap filling functions 42 to fill in identified gaps and/or smooth corners in the blended data 32, the second dataset 16, and/or the first dataset 15.

At 1312, the method 1300 includes generating an image with the first set of elevation data, the second set of elevation data, and the blended elevation data for the geographic area. The blending component 1102 may generate an image 44 with the geographic data 15 of the first dataset 15 and the geographic data 17 of the second dataset 16. The image 44 also has the blended data 32 in the blend region 22 between the geographic data 15 and the geographic data 17. In one example, the geographic data 15 includes elevation data 14 and the geographic data 17 includes elevation data 18. As such, the image 44 includes the elevation data 14 of the first dataset 12 and the elevation data 18 of the second dataset 16 with the blended data 32 in between. The blending component 1102 may cause the image 44 to be presented on one or more displays 104 in communication with the blending component 1102.

Figure 14:
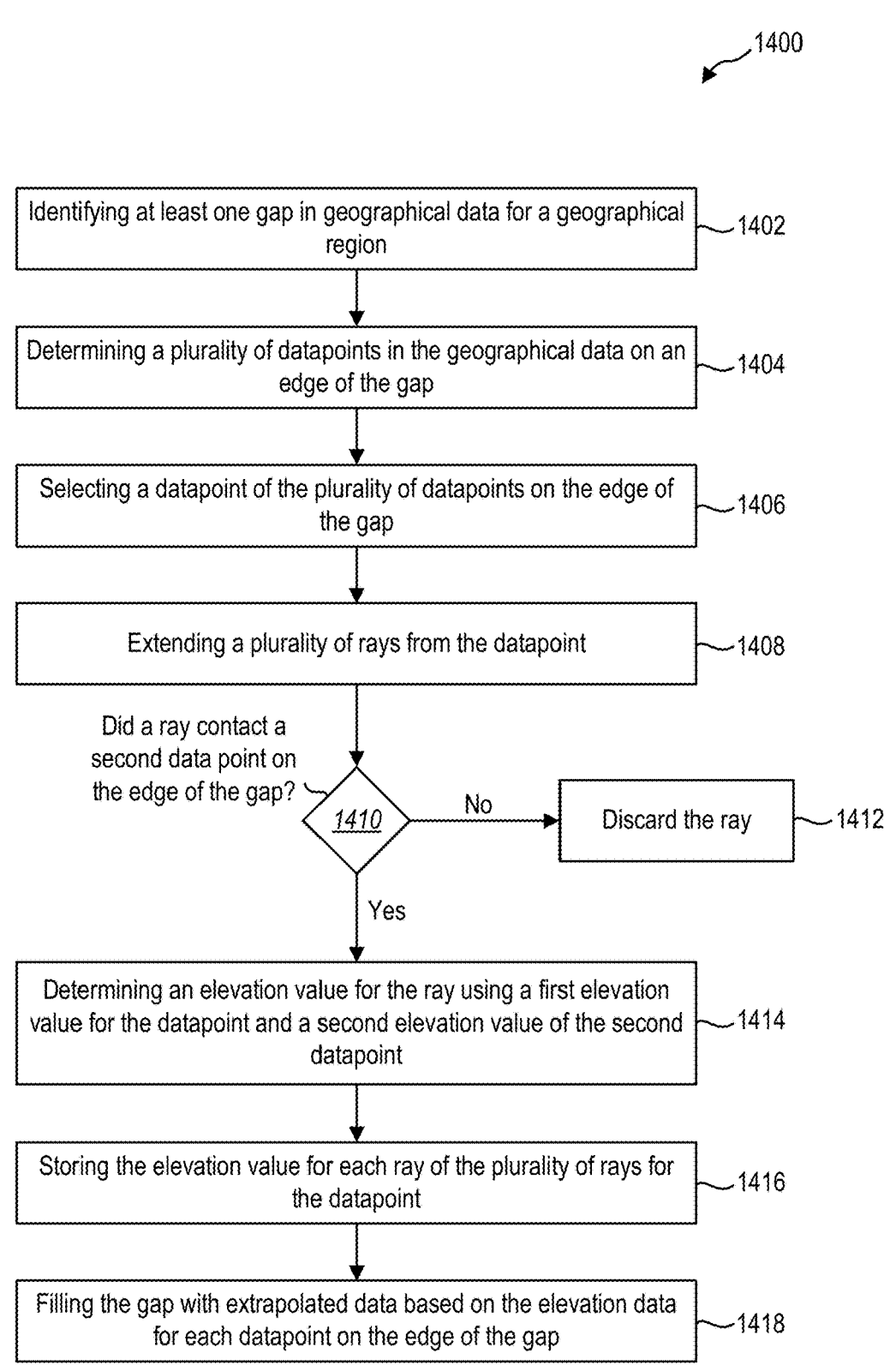
FIG. 14 illustrates an example method for filling in gaps in the geographic data in accordance with some implementations of the present disclosure.

Referring now to FIG. 14 illustrated is an example method 1400 for blending elevation data performed by one or more computing devices of environment 1100. The blending component 1102 (FIG. 11) may use the method 1400 for one or more gap filling functions 42 (FIG. 11). For example, the blending component 1102 uses the method 1400 to fill in any gaps and/or holes (e.g., missing data, incomplete data) with extrapolated data and/or estimated data. In addition, blending component 1102 uses the method 1400 to smooth out corners and/or angles where the geographic data 15, 17 may be missing. The actions of the method 1400 are discussed below with reference to the architectures of FIGS. 9A, 9B, and 11 but may be applicable to other specific environments.

At 1402, the method 1400 includes identifying at least one gap in geographic data for a geographic region. The blending component 1102 may identify one or more gaps in the geographic data 15, 17. The gap may occur from missing geographic data 15, 17 or from incomplete geographic data 15, 17. For example, geographic data may not have been collected (e.g., the surface did not reflect the elevation data) or obtained (e.g., the area was not included in the dataset) for the gap. For example, a gap 905 occurred in the elevation data 18 of the second dataset 16. Another example of the gap is a corner in the geographic data 15, 17 where a corner or region 936 occurs with high frequency data (e.g., elevation data 18) on each sides and lower frequency data (e.g., elevation data 14) in the region 936 between.

At 1404, the method 1400 includes determining a plurality of datapoints in the geographic data on an edge of the gap. The blending component 1102 may identify an edge of the gap and determine a plurality of datapoints in the geographic data 15, 17 on the edge of the gap. For example, the gap 905 has an edge 904 and a plurality of datapoints on the edge 904 of the gap 905 in the elevation data 18 are identified (e.g., pixels in the elevation data 18).

At 1406, the method 1400 includes selecting a datapoint of the plurality of datapoints on the edge of the gap. The blending component 1102 may select one datapoint of the plurality of datapoints on the edge of the gap. For example, a datapoint 902 is identified on the edge 904.

At 1408, the method 1400 includes extending a plurality of rays from the datapoint. The blending component 1102 may extend a plurality of rays from the datapoint a distance. For each datapoint on the edge 904, a plurality of rays are sent out the distance of the blend region 22 until the rays hit another datapoint on the edge 904 or extends further than the blend region 22. For example, a datapoint 902 is identified on the edge 904 and two rays 906, 908 are sent out from the datapoint 902.

At 1410, the method 1400 includes determining whether a ray of the plurality of rays contacted a second datapoint on the edge of the gap. The blending component 1102 may determine whether the ray hit another datapoint along the edge of the gap. For example, the ray 908 makes contact with another edge datapoint 910 across the gap 905.

At 1412, the method includes discarding the ray if the ray did not make contact with a second datapoint on the edge of the gap. The blending component 1102 may discard or not use the ray if the ray does not encounter another datapoint on the edge of the gap. For example, the ray 906 does not make contact with another datapoint on the edge 904, as such, the ray 906 is discarded and additional information from the ray 906 is not collected.

At 1414, the method includes determining an elevation value for the ray using a first elevation value for the datapoint and a second elevation value of the second datapoint. The blending component 1102 uses the first elevation value and the second elevation value to determine an elevation value for the ray. In some implementations, the blending component 1102 extends the ray further into the geographic data 15, 17 to collect additional datapoints in the geographic data 15, 17 to use in determining the elevation value for the ray. The ray 908 makes contact with another edge datapoint 910 across the gap 905. The direction of the ray 908 is extended further into the elevation data 18 past the edge datapoint 910 and another datapoint 912 is identified in the elevation data 18 across the gap 905. In addition, the ray 908 is extended backwards from the edge datapoint 902 into the elevation data 18 in the direction of the ray 908 to identify another datapoint 932 in the elevation data 18. The elevation values from the four datapoints (the two edge datapoints 902, 910 and the two datapoints 912, 914 in the elevation data) are used to fill in elevation values along the ray 908. For example, a cubic interpolation is used to provide values for every datapoint along the ray. Another example includes using a linear interpolation to provide values for every datapoint along the ray. The elevation values from for the ray 908 are stored with the edge datapoint 902.

The method 1400 may return to 1410 and determine for each ray of the plurality of rays whether the ray contacted another datapoint on the edge of the gap.

At 1416, the method 1400 includes storing the elevation value for each ray of the plurality of rays for the datapoint. The blending component 1102 may store the elevation values for each ray of the plurality of rays for the datapoints along the edge of the gap. In an implementation, one or more intersection points may be identified where two or more the rays cross or intersect. The elevation data from the two rays for the intersection point may be used to determine the elevation data for the intersection point. By having multiple rays cover the same intersection point, the estimate of the elevation data for the gap may improve by using the elevation data from the plurality of rays together.

The method 1400 may return to 1406 and repeat for all datapoints of the plurality of datapoints on the edge of the gap.

At 1418, the method 1400 includes filling the gap with extrapolated data based on the elevation data for each datapoint on the edge of the gap. The blending component 1102 may fill in the gap with the extrapolated elevation values from the different datapoints along the edge of the gap. For example, the gap 905 may be smoothly filled in with blended data elevation data estimated based on the elevation data extrapolated from the elevation data 18 from the different rays (e.g., rays 908, 920, 934).

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

INDUSTRIAL APPLICABILITY

The present disclosure is related to methods, devices, and systems for providing better terrain visualization. The methods and systems blend elevation data when combining geographic data sources (e.g., combining images or data gained via radar, optical imagery, or lidar). The methods and systems identify a blend region for transitioning between a first dataset and a second dataset. The blend region blends the geographic data of the second dataset and the geographic data of the first dataset together for transitioning between the different geographic data. A distance of the blend region is calculated based on a difference between the resolutions of the different datasets. If the difference in resolution is high, a longer blend distance is used for the distance 24. If the difference is resolution is low or minimal, a shorter blend distance is used for the distance 24. As such, different distances for the blend region are selected for different datasets of geographic data.

The methods and systems extrapolate geographic data from the second dataset to blend with the geographic data from the first dataset to create blended elevation data in the blend region. A plurality of datapoints in the blend region are identified and a plurality of methods are used for extrapolating data for the plurality of datapoints. In some implementations, all the datapoints in the blend region include extrapolated data. In some implementations, a subset of the datapoints in the blend region include extrapolated data.

One method for extrapolating data for datapoints in the blend region, is to identify a nearest datapoint (nearest neighbor) in the second dataset and extrapolate the geographic data from the nearest datapoint in the second dataset for the value of the datapoint in the blend region. Another method for extrapolating the data for the datapoints in the blend region is identifying a plurality of nearby datapoints (e.g., n neighbors, where n is an integer) in the second dataset and taking an average of the geographic data for the plurality of nearby datapoints. Another method for extrapolating the data for the datapoints in the blend region is calculating slope values of the plurality of nearby datapoints (e.g., n neighbors, where n is an integer) identified in the second dataset and using the slope values in averaging the geographic data for the plurality of nearby datapoints for the extrapolated data. Another method for creating the blended data is to average the extrapolated data for the datapoints in the blend region with an average of the slope values for the first dataset.

A blend function is applied to blend extrapolated elevation data in the one or more datapoints in the blend region with the first set of elevation data to generate blended elevation data. One or more blend functions are applied to blend the extrapolated data for the plurality of datapoints in the blend region with the geographic data from the first dataset to create blended data. One example of the blend function 34 is a linear blend function. Another example of the blend function is a cosine function. Other examples of the blend functions include any continuous function, such as, but not limited to, higher order polynomials functions or logarithmic functions.

The methods and systems optionally apply one or more blur functions to the blended data to smooth out or remove noise that may be present in the blended data. In addition, the methods and systems optionally apply one or more one or more face averaging functions to the blended data to average and/or flatten out any noise that is present the blended data. The methods and systems optionally remove a portion of the geographic data (e.g., data along a border of the geographic data) to remove noise or inaccurate data. The methods and systems optionally apply one or more low details functions to the blended data. The methods and systems optionally apply one or more one or more gap filling functions to fill in identified gaps and/or smooth corners in the blended data, the second dataset, and/or the first dataset.

The methods and systems generate an image for a geographic region with the first set of geographic data, the second set of geographic data, and the blended elevation data.

One use case of the present disclosure includes using the terrain visualization for flight simulators. Another use case of the present disclosure includes using the three dimensional terrain display for augmented reality (AR) and/or virtual reality (VR) applications. Another use case of the present disclosure includes using the terrain visualization in mapping applications.

Another use case of the present disclosure includes using the terrain visualization for navigation applications. Current navigation applications (e.g., for providing turn by turn driving directions) only provide street views of the directions. By showing the terrain while providing navigation directions, users may see the current terrain while driving (e.g., driving over mountains, approaching a cliff, or heading down into a valley).

One technical advantage of some implementations of the methods and systems is providing a single seamless elevation model by mapping the elevation data from different datasets together smoothly while transitioning between the elevation data received.

(A1) Some implementations include a method for blending elevation data (e.g., elevation data 14, 18). The method includes receiving (1302) a first dataset (e.g., first dataset 12) with a first set of elevation data (e.g., elevation data 14) for a geographic area (e.g., geographic area 10). The method includes receiving (1304) a second dataset (e.g., second dataset 16) with a second set of elevation data (e.g., elevation data 18) for the geographic area. The method includes determining (1306) a distance (e.g., distance 24) for a blend region (e.g., blend region 22) for transitioning between the first dataset and the second dataset. The method includes extrapolating (1308) elevation data from the second set of elevation data for one or more datapoints (e.g., datapoints 26) in the blend region. The method includes applying (1310) a blend function (e.g., blend function 34) to blend the extrapolated elevation data (e.g., extrapolated data 28) in the one or more datapoints in the blend region with the first set of elevation data to generate blended elevation data (e.g., blended data 32) in the blend region. The method includes generating (1312) an image (e.g., image 44) with the first set of elevation data, the second set of elevation data, and the blended elevation data for the geographic area.

(A2) In some implementations, the method of A1 includes for each datapoint of one or more datapoints in the blend region determining a nearest datapoint in the second set of elevation data; and using an elevation value from the nearest datapoint as the extrapolated elevation data.

(A3) In some implementations, the method of A1 or A2 includes for each datapoint of the one or more datapoints in the blend region: determining a plurality of nearest datapoints in the second set of elevation data; and using an average of elevation values from the plurality of the nearest datapoints as the extrapolated elevation data for the datapoint.

(A4) In some implementations, the method of any of A1-A3 includes for each nearest datapoint of the plurality of nearest datapoints: extending an ray from the nearest datapoint a distance into the second set of elevation data to a datapoint at the end of the ray; computing an elevation difference between an elevation value for the nearest datapoint and another elevation value for the datapoint at an end of the ray to determine a general slope value for the nearest datapoint; and using an average of the general slope value for the plurality of nearest datapoints as the extrapolated elevation data for the datapoint.

(A5) In some implementations, the method of any of A1-A4 includes identifying a corresponding datapoint in the first set of elevation data; extending a second ray from the corresponding datapoint a second distance into the first set of elevation data to a second datapoint at the end of the second ray to generate a second general slope value for the corresponding datapoint; and using the second general slope value for the elevation data for the first dataset when blending with the extrapolated elevation data to generate the blended elevation data.

(A6) In some implementations, the method of any of A1-A5 includes identifying at least one datapoint in the blended elevation data; determining a radius within the blended elevation data from the at least one datapoint; applying a blur kernel to a plurality of datapoints within the radius; and updating the blended elevation data for the plurality of datapoints based on the blur kernel.

(A7) In some implementations, the method of any of A1-A6 includes creating three dimensional polygonal meshes for each datapoint in the blended elevation data; and for each vertex of the three dimensional polygonal meshes: computing normals for each face and for each vertex; averaging the normals together; and determine whether to move the vertex up or down based on the averaging of the normals.

(A8) In some implementations of the method of any of A1-A7, the elevation data for the first dataset is low resolution data.

(A9) In some implementations of the method of any of A1-A8, the elevation data is obtained using radar derived sources.

(A10) In some implementations of the method of any of A1-A9, the elevation data for the second dataset is high resolution data.

(A11) In some implementations of the method of any of A1-A10, the elevation data is obtained using laser derived sources.

(A12) In some implementations of the method of any of A1-A11, the elevation data of the first dataset and the elevation data from the second dataset include high resolution data, and the elevation data of the first dataset is obtained at a first time period and the elevation data of the second dataset is obtained at a second time period.

(A13) In some implementations of the method of any of A1-A12, the blend function is a continuous function.

(A14) In some implementations of the method of any of A1-A13, the blend function is one or more of a cosine function, higher order polynomials functions, or logarithmic functions.

(A15) In some implementations, the method of any of A1-A14 includes causing the image to be presented on a display.

(B1) Some implementations include a method for filling gaps in geographic data (e.g., geographic data 15, 17). The method includes identifying (1402) at least one gap (e.g., gap 905 or gap 936) in geographic data for a geographic region (e.g., geographic area 10). The method includes determining (1404) a plurality of datapoints (e.g., datapoints 902, 918, 940) in the geographic data on an edge (e.g., edge 904, edge 938) of the gap. The method includes for each datapoint on the edge, extending (1408) a plurality of rays (e.g., rays 906, 908, 920, 934, 948, 950) from the datapoint a distance; if a ray of the plurality of rays contacts a second datapoint (e.g., datapoints 922, 926, 942) on the edge of the gap, determining (1414) an elevation value for the ray using a first elevation value for the datapoint and a second elevation value of the second datapoint; and storing (1416) the elevation value for each ray of the plurality of rays for the datapoint. The method includes filling (1418) in the gap with extrapolated geographic data based on the elevation value for each datapoint on the edge of the gap.

(B2) In some implementations, the method of B1 includes determining additional datapoints along the ray in the geographic data; using additional elevation values from the additional datapoints with the first elevation value and the second elevation value to apply a cubic interpolation or a linear interpolation to fill in elevation values along the ray; storing a ray of elevation values for each ray of the plurality of rays for the datapoint; and filling in the gap with extrapolated geographic data based on the ray of elevation values for each ray of the plurality of rays for the datapoint.

(B3) In some implementations, the method of B1 or B2 includes identifying one or more intersection points where two rays of the plurality of rays overlap over the gap; and using one or more of an average, a mean, a median, or a mode of the ray of elevation values for the two rays to determine an updated elevation value for the one or more intersection points.

(B4) In some implementations of the method of any of B1-B3, the at least one gap is one or more of missing geographic data or incomplete geographic data.

(B5) In some implementations of the method of any of B1-B4, the at least one gap is an angle between surfaces in the geographic data that includes high resolution elevation data.

The present disclosure may be implemented in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:
1. A method for blending elevation data, comprising:
receiving a first dataset with a first set of elevation data for
  a geographic area;

receiving a second dataset with a second set of elevation data for the geographic area;

determining a distance for a blend region for transitioning between the first dataset and the second dataset, wherein a length of the distance is based on a difference between resolutions of the first dataset and the second dataset, and wherein the blend region includes a combined set of datapoints based on a first set of datapoints from the first dataset and a second set of datapoints from the second dataset;

generating extrapolated elevation data from the second set of elevation data using the combined set of datapoints in the blend region by:

determining a ray from a first datapoint from the first set of datapoints to a nearest datapoint from the second set of datapoints;

extending the ray from the nearest datapoint to an additional datapoint within the second set of datapoints;

determining a general slope value by computing an elevation difference between a first elevation value for the nearest datapoint and a second elevation value for the additional datapoint; and using the general slope value as the extrapolated elevation data for the first datapoint;

applying a blend function to blend the extrapolated elevation data for datapoints in the blend region with the first set of elevation data to generate blended elevation data in the blend region; and generating an image with the blended elevation data for the geographic area, and one or more of the first set of elevation data, and the second set of elevation data.

2. The method of claim 1, further comprising:

for each datapoint of the first set of datapoints the blend region:

determining the nearest datapoint in the second set of elevation data; and using an elevation value from the nearest datapoint to determine the extrapolated elevation data for each datapoint.

3. The method of claim 2, further comprising:

for each datapoint of the first set of datapoints in the blend region:

determining a plurality of nearest datapoints in the second set of elevation data; and generating a plurality of rays between the datapoint of the first set of datapoints and the plurality of nearest datapoints.

4. The method of claim 3, further comprising:

for each datapoint of the first set of datapoints in the blend region, extending the plurality of rays from the plurality of nearest datapoints to a plurality of corresponding datapoints in the second set of elevation data to create a plurality of extended rays; and for each of the plurality of nearest datapoints, determine a general slope value by averaging the elevation difference between elevation values for the plurality of nearest datapoints and elevation values for the plurality of corresponding datapoints at an end of the plurality of rays.

5. The method of claim 4, further comprising:

identifying a corresponding datapoint in the first set of elevation data;

extending a second ray from the corresponding datapoint a second distance into the first set of elevation data to a second datapoint at the end of the second ray to generate a second general slope value for the corresponding datapoint; and using the second general slope value for the elevation data for the first dataset when blending with the extrapolated elevation data to generate the blended elevation data.

6. The method of claim 1, further comprising:

identifying at least one datapoint in the blended elevation data;

determining a radius within the blended elevation data from the at least one datapoint;

applying a blur kernel to a plurality of datapoints within the radius; and updating the blended elevation data for the plurality of datapoints based on the blur kernel.

7. The method of claim 1, further comprising:

creating three dimensional polygonal meshes for each datapoint in the blended elevation data; and for each vertex of the three dimensional polygonal meshes:

computing normals for each face and for each vertex;

averaging the normals together; and determine whether to move the vertex up or down based on averaging of the normals.

8. A method for blending geographic data, comprising:

receiving a first dataset with a first set of geographic data for a geographic area;

receiving a second dataset with a second set of geographic data for the geographic area, wherein the second dataset with the second set of geographic data provides less coverage of the geographic area than the first set of geographic data;

creating a blend region outside of the second set of geographic data for the geographic area, wherein the blend region includes a combined set of datapoints based on a first set of datapoints from the first dataset and a second set of datapoints from the second dataset;

generating extrapolated geographic data from the second set of geographic data for the combined set of datapoints in the blend region by:

generating a ray from a first datapoint from the first set of datapoints to a nearest datapoint from the second set of datapoints;

extending the ray from the nearest datapoint to an additional datapoint within the second set of datapoints;

determining a general slope value by computing an elevation difference between a first elevation value for the nearest datapoint and a second elevation value for the additional datapoint; and using the general slope value as the extrapolated geographic data for the first datapoint;

applying a blend function to blend the extrapolated geographic data for datapoints in the blend region with the first set of geographic data to generate blended geographic data in the blend region; and generating an image with the first set of geographic data, the second set of geographic data, and the blended geographic data for the geographic area.

9. The method of claim 8, wherein the geographic data for the first dataset is low resolution data.

10. The method of claim 8, wherein the geographic data for the second dataset is high resolution data.

11. The method of claim 8, wherein data in the blend region transitions between an end of the second dataset to the first dataset while maintaining information provided by the geographic data of the second dataset.

12. The method of claim 8, wherein the first set of geographic data and the second set of geographic data are an elevation data.

13. The method of claim 12, further comprising:

for each datapoint of the first set of datapoints the blend region:

determining the nearest datapoint in the second set of geographic data; and using a value from the nearest datapoint to determine the extrapolated geographic data for each datapoint.

14. The method of claim 13, further comprising:

for each datapoint of the first set of datapoints in the blend region:

determining a plurality of nearest datapoints in the second set of geographic data; and generating a plurality of rays between the datapoint of the first set of datapoints and the plurality of nearest datapoints.

15. The method of claim 14, further comprising:

for each nearest datapoint of the plurality of nearest datapoints:

extending a ray from the nearest datapoint a distance into the second set of geographic data to a datapoint at an end of the ray; and computing a difference between an elevation value for the nearest datapoint and another value for the datapoint at an end of the ray to determine a general slope value for the nearest datapoint.

16. The method of claim 15, further comprising:

identifying a corresponding datapoint in the first set of geographic data;

extending a second ray from the corresponding datapoint a second distance into the first set of geographic data to a second datapoint at the end of the second ray to generate a second general slope value for the corresponding datapoint; and using the second general slope value for the geographic data for the first dataset when blending with the extrapolated geographic data to generate the blended geographic data.

17. The method of claim 8, wherein the first dataset and the second dataset are obtained by one or more of a radar, a laser derived source, and optically derived source.

18. A method for blending geographic data, comprising:

receiving a first dataset with a first set of geographic data for a geographic area;

receiving a second dataset with a second set of geographic data for the geographic area, wherein the first dataset and the second dataset are obtained at different time periods;

creating a blend region on an area in the geographic area wherein the first dataset and the second dataset for the geographic area are discontinuous, wherein the blend region includes a combined set of datapoints based on a first set of datapoints from the first dataset and a second set of datapoints from the second dataset;

generating extrapolated geographic data from the second set of geographic data for the combined set of datapoints in the blend region by:

generating a ray from a first datapoint from the first set of datapoints to a nearest datapoint from the second set of datapoints;

extending the ray from the nearest datapoint to an additional datapoint within the second set of datapoints;

determining a general slope value by computing an elevation difference between a first elevation value for the nearest datapoint and a second elevation value for the additional datapoint; and using the general slope value as the extrapolated geographic data for the first datapoint;

applying a blend function to blend the extrapolated geographic data for datapoints in the blend region with the first set of geographic data to generate blended geographic data in the blend region; and generating an image with the blended geographic data for the geographic area, and one or more of the first set of geographic data, and the second set of geographic data.

19. The method of claim 18, wherein the second set of geographic data is obtained at a later time period than the first set of geographic data.

20. The method of claim 18, wherein the blend function is one or more of a cosine function, higher order polynomials functions, or logarithmic functions.

*   *   *   *   *